(12) United States Patent
Famularo et al.

(10) Patent No.: US 12,332,658 B2
(45) Date of Patent: Jun. 17, 2025

(54) UNMANNED AIRCRAFT CONTROL USING ENGINE TORQUE CONTROL SYSTEM

(71) Applicant: Joby Aero, Inc., Santa Cruz, CA (US)

(72) Inventors: Douglas Famularo, San Francisco, CA (US); Edward Lim, Pacifica, CA (US); Joshua Rosenkranz, San Francisco, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 441 days.

(21) Appl. No.: 17/718,841

(22) Filed: Apr. 12, 2022

(65) Prior Publication Data

US 2022/0334595 A1    Oct. 20, 2022

Related U.S. Application Data

(60) Provisional application No. 63/175,785, filed on Apr. 16, 2021.

(51) Int. Cl.
| | |
|---|---|
| *G05D 1/04* | (2006.01) |
| *G05D 1/00* | (2006.01) |
| *G05D 1/10* | (2006.01) |
| *G08G 5/26* | (2025.01) |
| *G08G 5/30* | (2025.01) |
| *B64U 101/60* | (2023.01) |

(52) U.S. Cl.
CPC ............ *G05D 1/042* (2013.01); *G05D 1/101* (2013.01); *G08G 5/26* (2025.01); *G08G 5/30* (2025.01); *B64U 2101/60* (2023.01); *B64U 2201/10* (2023.01); *B64U 2201/20* (2023.01)

(58) Field of Classification Search
None
See application file for complete search history.

(56) References Cited

U.S. PATENT DOCUMENTS

| | | | |
|---|---|---|---|
| 2015/0198930 A1* | 7/2015 | Antraygue | G05B 11/42 318/635 |
| 2019/0047715 A1* | 2/2019 | Hedrick | G08G 5/04 |
| 2020/0118450 A1* | 4/2020 | Gariel | G05D 1/0088 |

OTHER PUBLICATIONS

Cessna Grand Caravan Information Manual—Dated Jun. 5, 2008. Including a description of an aircraft Torquemeter at p. 440, takeoff torque limit graph at p. 235, and climb torque limit graph at p. 236.
(Continued)

*Primary Examiner* — Adam D Tissot
*Assistant Examiner* — Laura E Linhardt
(74) *Attorney, Agent, or Firm* — Dority & Manning, P.A.

(57) ABSTRACT

An aircraft control system includes a longitudinal control module, an engine torque control module, and an actuator control system. The longitudinal control module is configured to generate a desired torque value and a desired elevator position value for an aircraft based on a desired airspeed value, a desired altitude value, an actual airspeed value, and an actual altitude value. The engine torque control module is configured to generate a desired power lever position value based on the desired torque value and a measured engine torque value that indicates a measured engine torque in the aircraft. The actuator control system is configured to generate a power lever position command and an elevator position command for the aircraft based on the desired power lever position value and the desired elevator position value.

20 Claims, 16 Drawing Sheets

(56) References Cited

OTHER PUBLICATIONS

Autopilot—Wikipedia page. Page is dated Dec. 14, 2019. Page was accessed on Sep. 1, 2022 at: https://web.archive.org/web/20191214034146/https://en.wikipedia.org/wiki/Autopilot.

Autothrottle—Wikipedia page. Page is dated Dec. 14, 2019. Page was accessed on Sep. 1, 2022 at: https://web.archive.org/web/20191214014813/https://en.wikipedia.org/wiki/Autothrottle.

FADEC—Wikipedia page. Page is dated Dec. 14, 2019. Page was accessed on Sep. 1, 2022 at: https://web.archive.org/web/20191214015256/https://en.wikipedia.org/wiki/FADEC.

Jimenez, P.; Lichota, P.; Agudelo, D.; Rogowski, K. Experimental Validation of Total Energy Control System for UAVs. Energies 2020, 13, 14. Available at https://doi.org/10.3390/en13010014. Published Dec. 18, 2019.

\* cited by examiner

FIG. 15

UNMANNED AIRCRAFT CONTROL USING ENGINE TORQUE CONTROL SYSTEM

CROSS-REFERENCE TO RELATED APPLICATION

This application claims the benefit of U.S. Provisional Application No. 63/175,785, filed on Apr. 16, 2021. The disclosure of the above application is incorporated herein by reference in its entirety.

FIELD

The present disclosure relates to aircraft control systems.

BACKGROUND

An aircraft control system may include flight controls and one or more flight computers that may control aircraft actuators to provide responses to pilot input on the flight controls. For example, the aircraft control system may interpret a pilot's inputs and actuate control surface positions required to achieve the pilot's desired intentions. Some aircraft may include an autopilot system that may control the path of the aircraft without constant pilot input. Some aircraft may also include an autothrottle that controls the power delivered by the engines. An autonomous aircraft may fly under control of automatic aircraft control systems that may not need intervention from a pilot.

SUMMARY

In one example, the present disclosure is directed to an aircraft control system comprising a longitudinal control module, an engine torque control module, and an actuator control system. The longitudinal control module is configured to generate a desired torque value and a desired elevator position value for an aircraft based on a desired airspeed value, a desired altitude value, an actual airspeed value, and an actual altitude value. The engine torque control module is configured to generate a desired power lever position value based on the desired torque value and a measured engine torque value that indicates a measured engine torque in the aircraft. The actuator control system is configured to generate a power lever position command and an elevator position command for the aircraft based on the desired power lever position value and the desired elevator position value.

In one example, the present disclosure is directed to a non-transitory computer-readable medium comprising computer-executable instructions configured to cause one or more processing units of an aircraft to generate a desired torque value and a desired elevator position value for an aircraft based on a desired airspeed value, a desired altitude value, an actual airspeed value, and an actual altitude value. The instructions are further configured to generate a desired power lever position value based on the desired torque value and a measured engine torque value that indicates a measured engine torque in the aircraft. The instructions are further configured to generate a power lever position command and an elevator position command for the aircraft based on the desired power lever position value and the desired elevator position value.

BRIEF DESCRIPTION OF THE DRAWINGS

The present disclosure will become more fully understood from the detailed description and the accompanying drawings.

Figure 15:
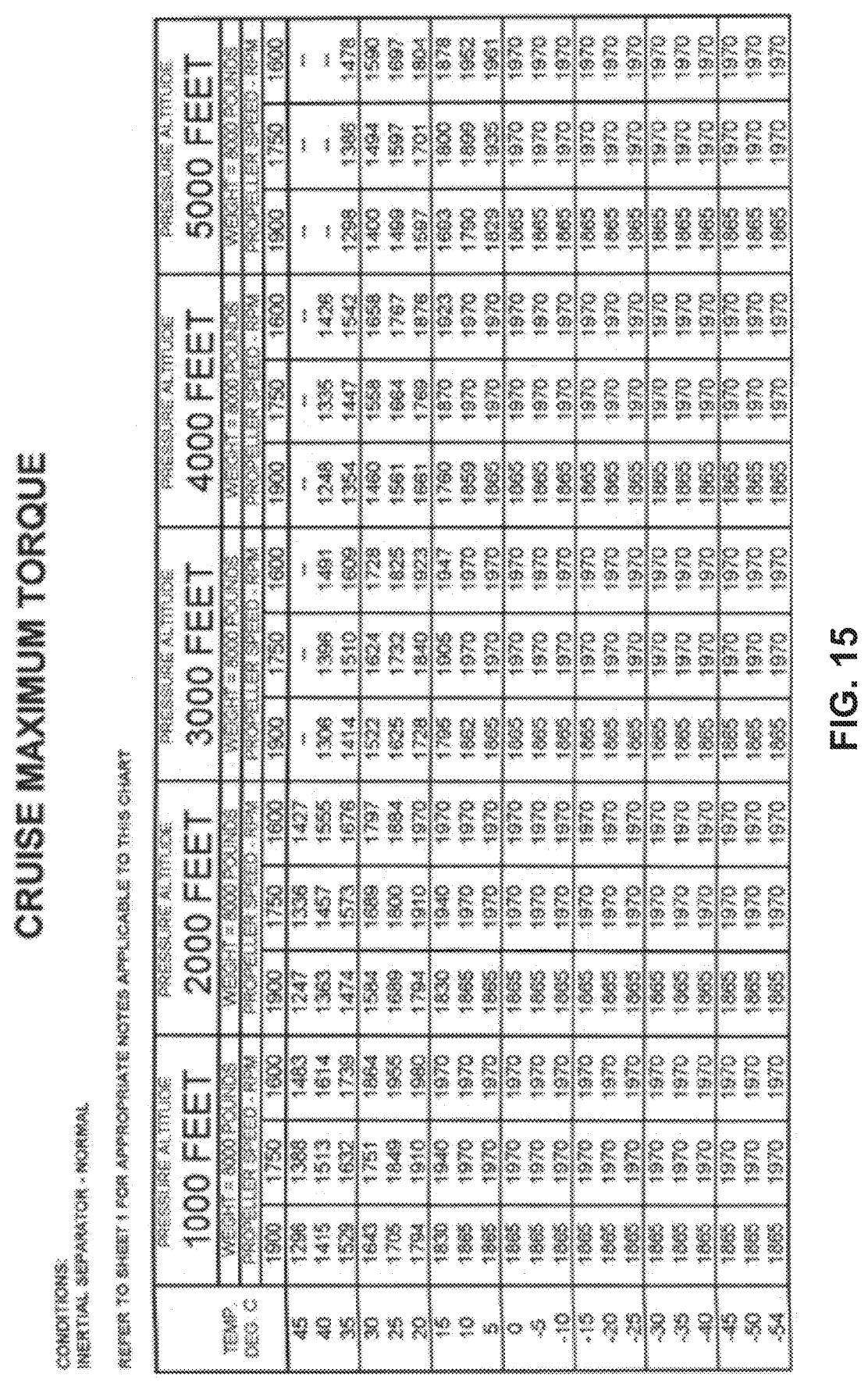

FIGS. 13-15 illustrate example engine torque limit tables and graphs.

In the drawings, reference numbers may be reused to identify similar and/or identical elements.

DETAILED DESCRIPTION

Figure 1A:
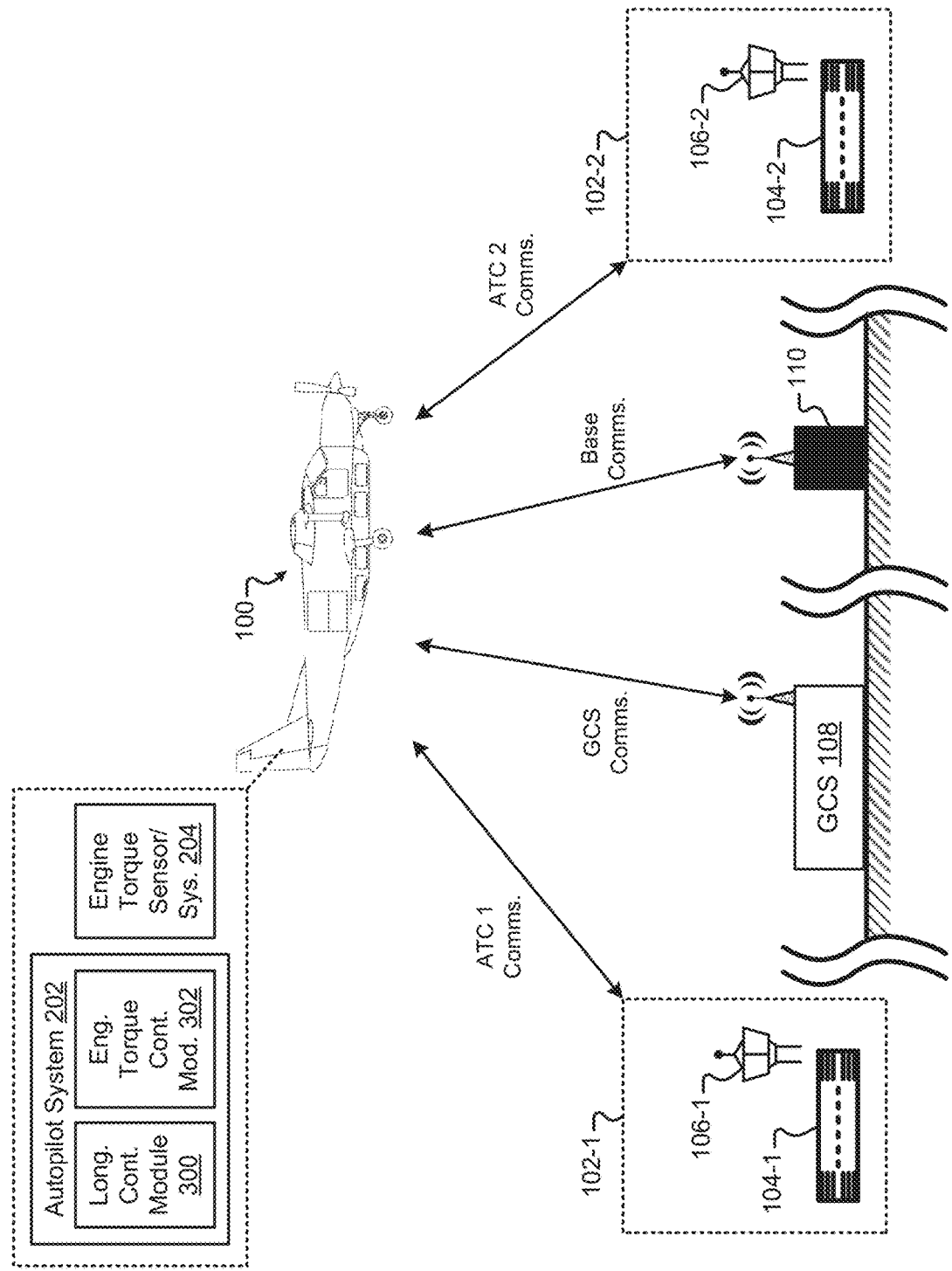
FIG. 1A illustrates an example environment that includes an aircraft in communication with a ground control station, air traffic control, and a base station.

A flight control system of the present disclosure (e.g., flight control system 200 of FIGS. 2-3) may incorporate engine torque feedback into a power control architecture (e.g., an autothrottle control). For example, the flight control system 200 may control an aircraft power command (e.g., a power lever position) based on engine torque and other aircraft parameters. In some implementations, the flight control system 200 (e.g., an autopilot system 202) may determine a desired engine torque value (i.e., torque setpoint) based on a desired airspeed (i.e., airspeed setpoint) and/or desired altitude (i.e., altitude setpoint). In these implementations, the flight control system 200 may generate the aircraft power command based on the desired engine torque.

In some implementations, an aircraft power command may be based on maximum climb torque or takeoff torque, as specified in an aircraft flight manual (AFM) for the aircraft. For example, maximum climb torque or takeoff torque performance tables may be implemented as software table lookups as a function of flight conditions. In some implementations, the desired engine torque value may be specified by an operator/pilot. In some implementations, an aircraft power command may be based on other factors, such as flap operation. As such, the flight control system of the present disclosure may control aircraft power (e.g., power lever position) based on at least one of a desired engine torque value, a measured engine torque value, and one or more other parameters (e.g., airspeed, altitude, flap operation, and/or operator input).

Using measured engine torque in the flight control system 200 may allow for aircraft control based on the internal dynamics of the engine, such as the torque/power of the engine. In some implementations, engine torque may be a better analog for power than other control parameters, such as power lever position. For example, although both power lever position and engine power may be related, engine torque may map better in a control system to a variety of aircraft operating conditions (e.g., air temperature, altitude, etc.).

The flight control system 200 may prevent a power command that may risk an overtorque condition in which the engine torque exceeds a maximum engine torque limit. The desired engine torque may be limited according to torque limits (e.g., limits specified in the AFM). In some implementations, the torque limits may be implemented as a table lookup as a function of flight conditions. Using a maximum torque limit as an input parameter, the flight control system 200 may allow for maneuvers requiring maximum engine torque without perfect prior understanding of the maximum safe power command setting across varying conditions (e.g., temperature, altitude, and dynamic pressure). Additionally, the flight control system 200 may allow for robust autothrottle control and safe expansion of the flight envelope without a high fidelity model of the engine dynamics, which may be highly variable and nonlinear. Preventing overtorque may also increase operational efficiency and prevent damage to the engine and other potential maintenance consequences.

In some implementations, the flight control system 200 may store conditions associated with reaching the maximum torque limit. For example, the flight control system 200 may store power command values (e.g., power lever position), temperature values (e.g., air temperature), airspeed values, altitude values, and/or other values associated with maximum engine torque limits. In some implementations, the stored conditions mapping engine torque to power lever and flight conditions may be used to generate a predictive or feed-forward component to the torque control for faster, more accurate, reduced-lag tracking of the desired torque command. In some implementations, the stored conditions may be used to compute the power command (e.g., power lever position) as a function of desired torque when torque feedback is lost due to sensor failure (e.g., torque sensor failure). In some implementations, the stored conditions may be used to limit power to prevent overtorque when torque feedback is lost due to torque sensor failure.

Using a control system of the present disclosure, a user can track how a specific engine is operating in specific conditions (e.g., altitude and temperature). Determining how a specific engine operates in different conditions may allow the user to update the flight control system 200 for improved engine performance. In some implementations, the user may generate/update one or more controllers for the control system based on an engine model and data collected for the engine and associated operating conditions.

In some implementations, an aircraft manufacturer may manufacture an aircraft including the flight control system 200 and other components described herein (e.g., torque sensors/systems 204). In some implementations, a user may add the flight control system 200 and other components (e.g., software/hardware components) into an existing used/new aircraft. For example, hardware/software that implements the flight control system 200 described herein may be provided to aircraft manufacturers/owners for modifying their existing aircraft to be optionally piloted or autonomous. As such, the flight control system 200 of the present disclosure may be included into a variety of different aircraft in different manners. For example, the flight control system 200 may be implemented in autonomous aircraft, more conventional aircraft (e.g., non-autonomous aircraft), in an autopilot with autothrottle, and/or as a standalone autothrottle.

Figure 1B:
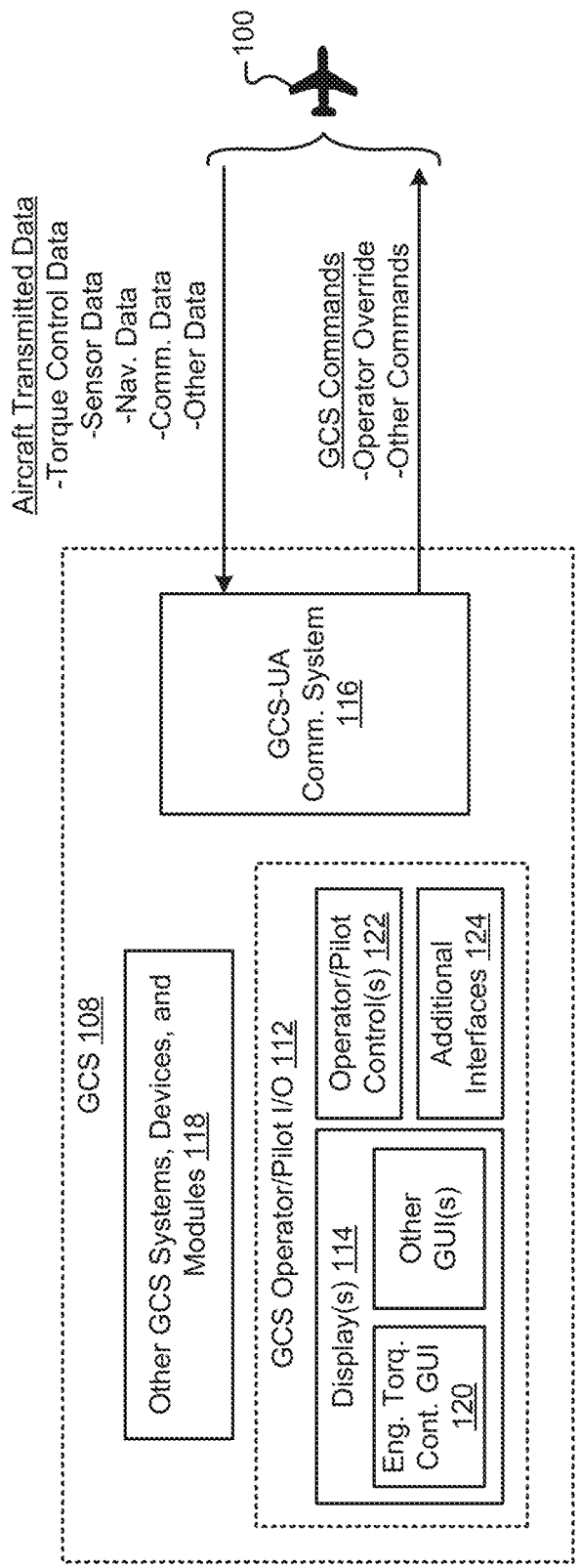
FIG. 1B illustrates an example ground control station in communication with an aircraft.
Figure 2:
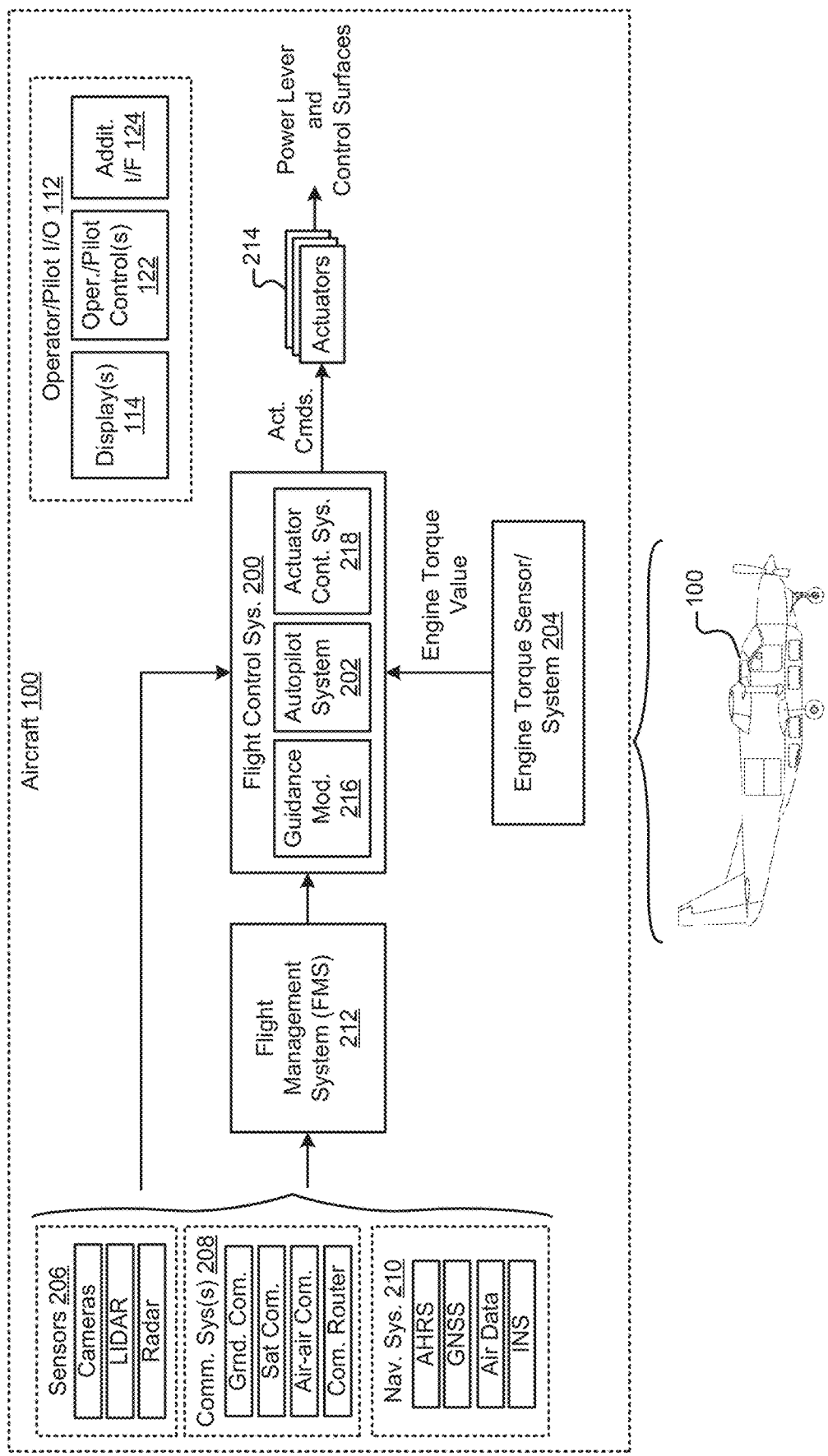
FIG. 2 is a functional block diagram of an example aircraft.
Figure 3:
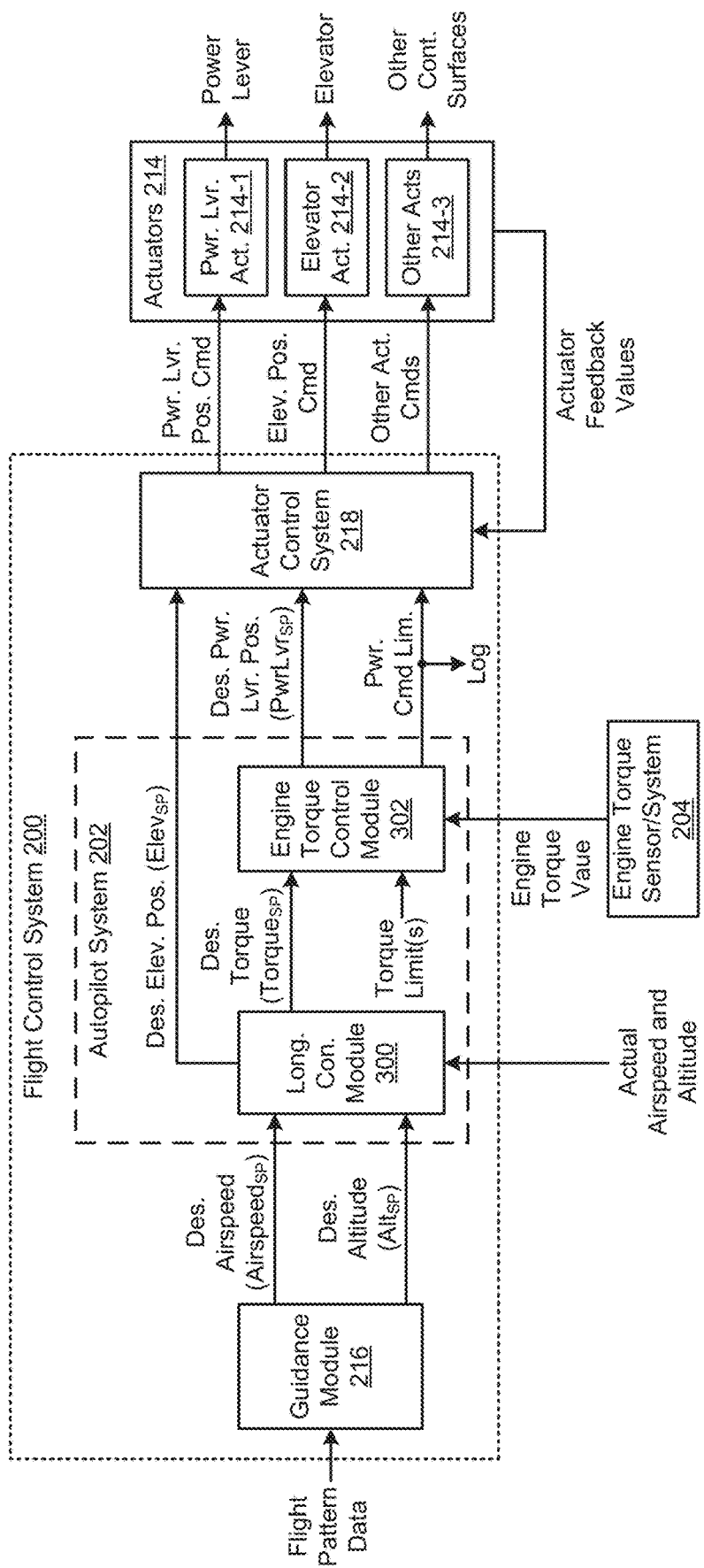
FIGS. 3-4 illustrate an example flight control system that implements an engine torque control system of the present disclosure.
Figure 4:
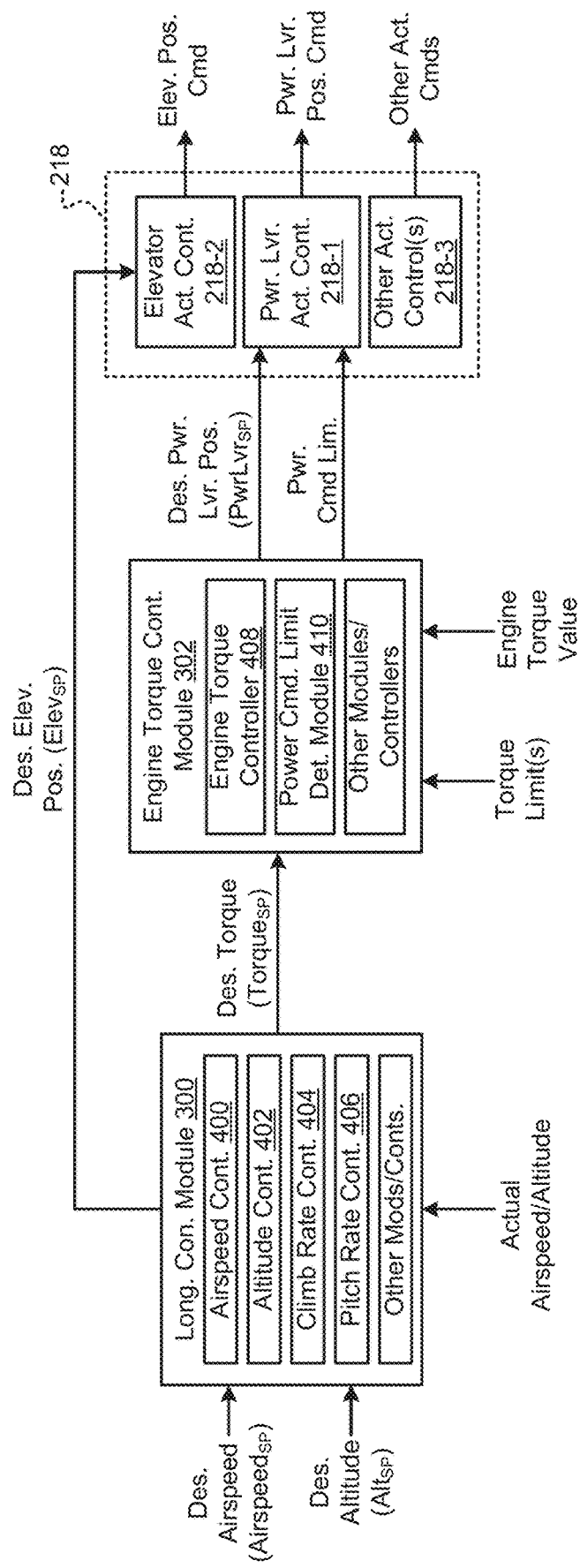
Figure 5:
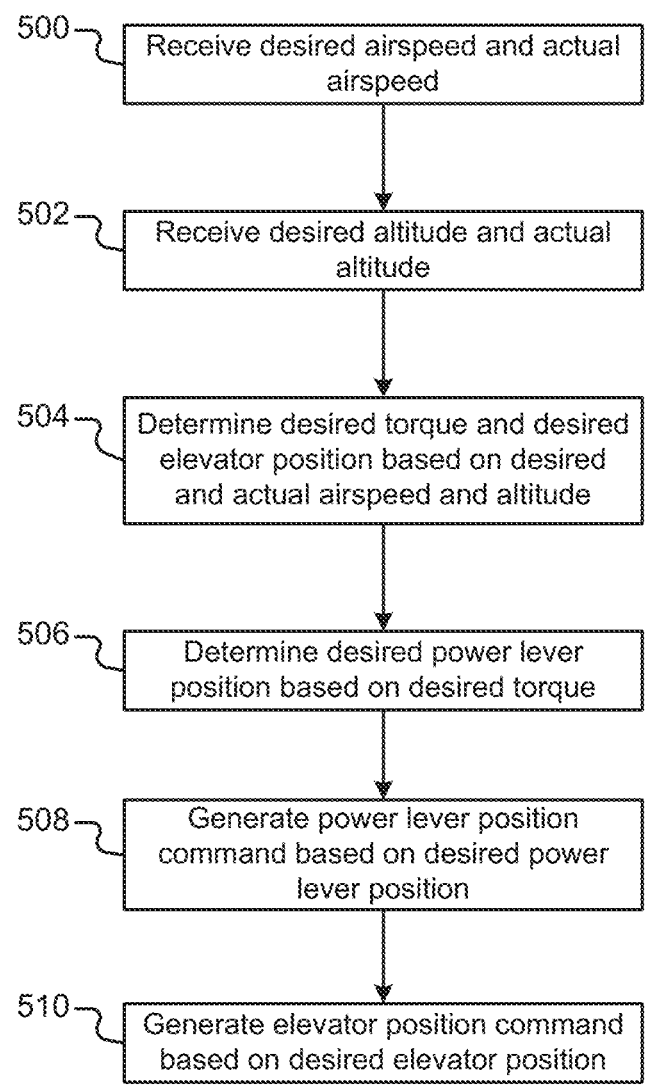
FIGS. 5-6 illustrate example methods that describe operation of an engine torque control system.
Figure 6:
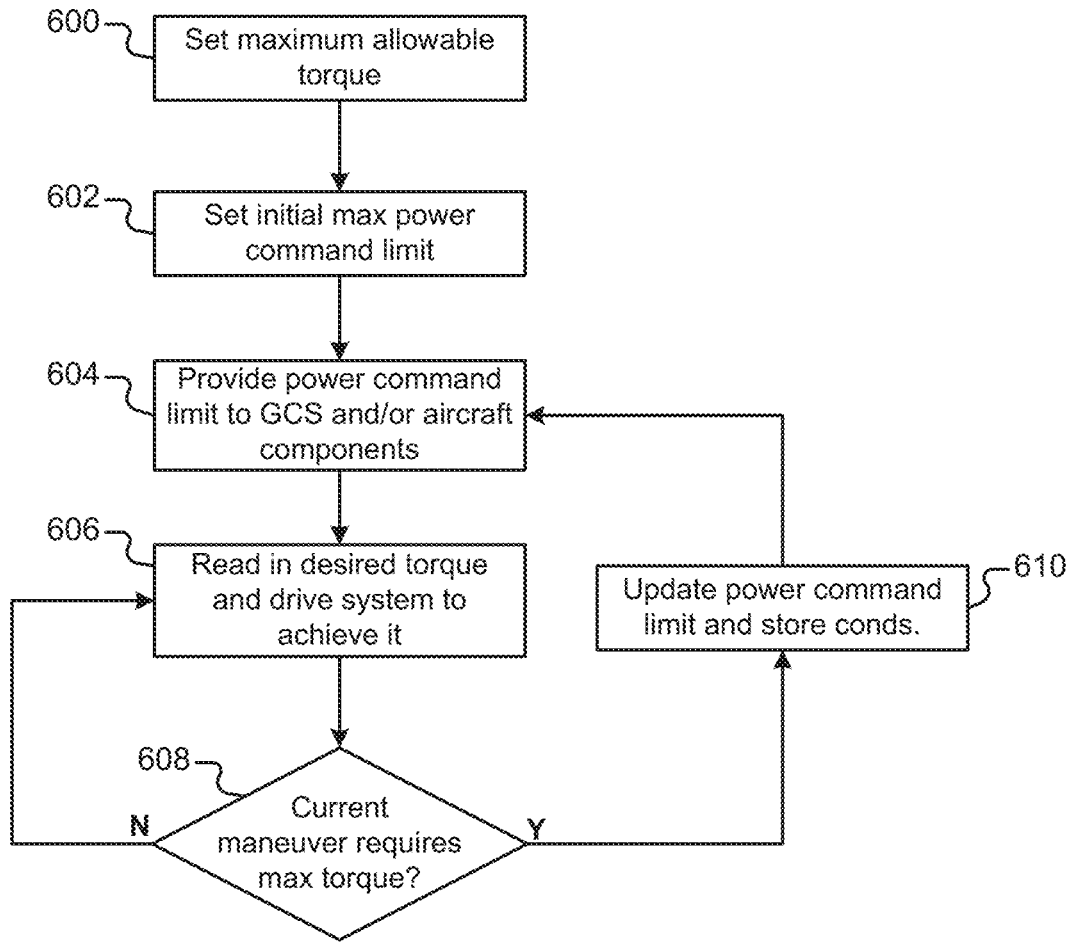
Figure 7:
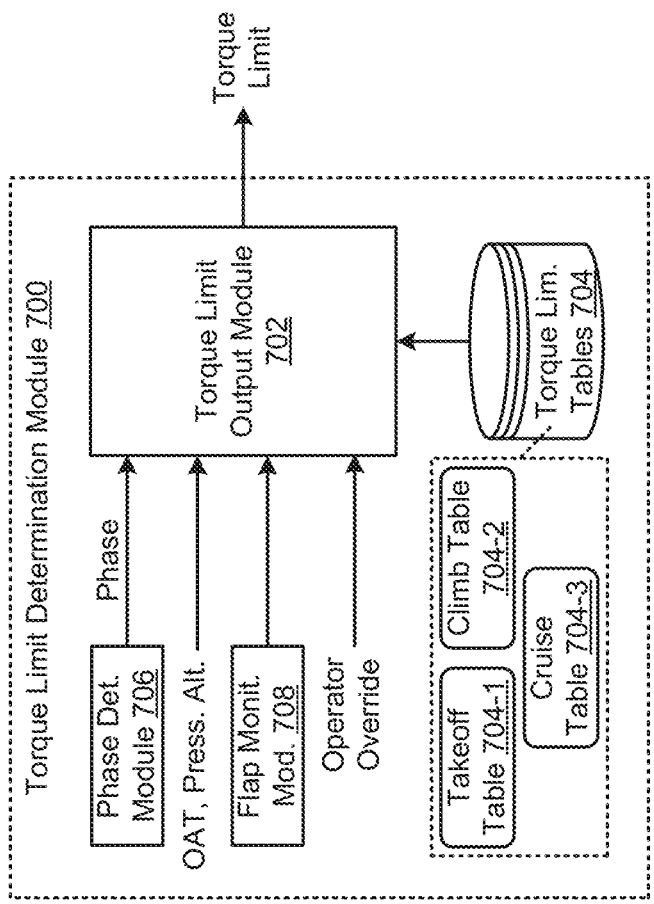
FIG. 7 is a functional block diagram of an example torque limit determination module.
Figure 8:
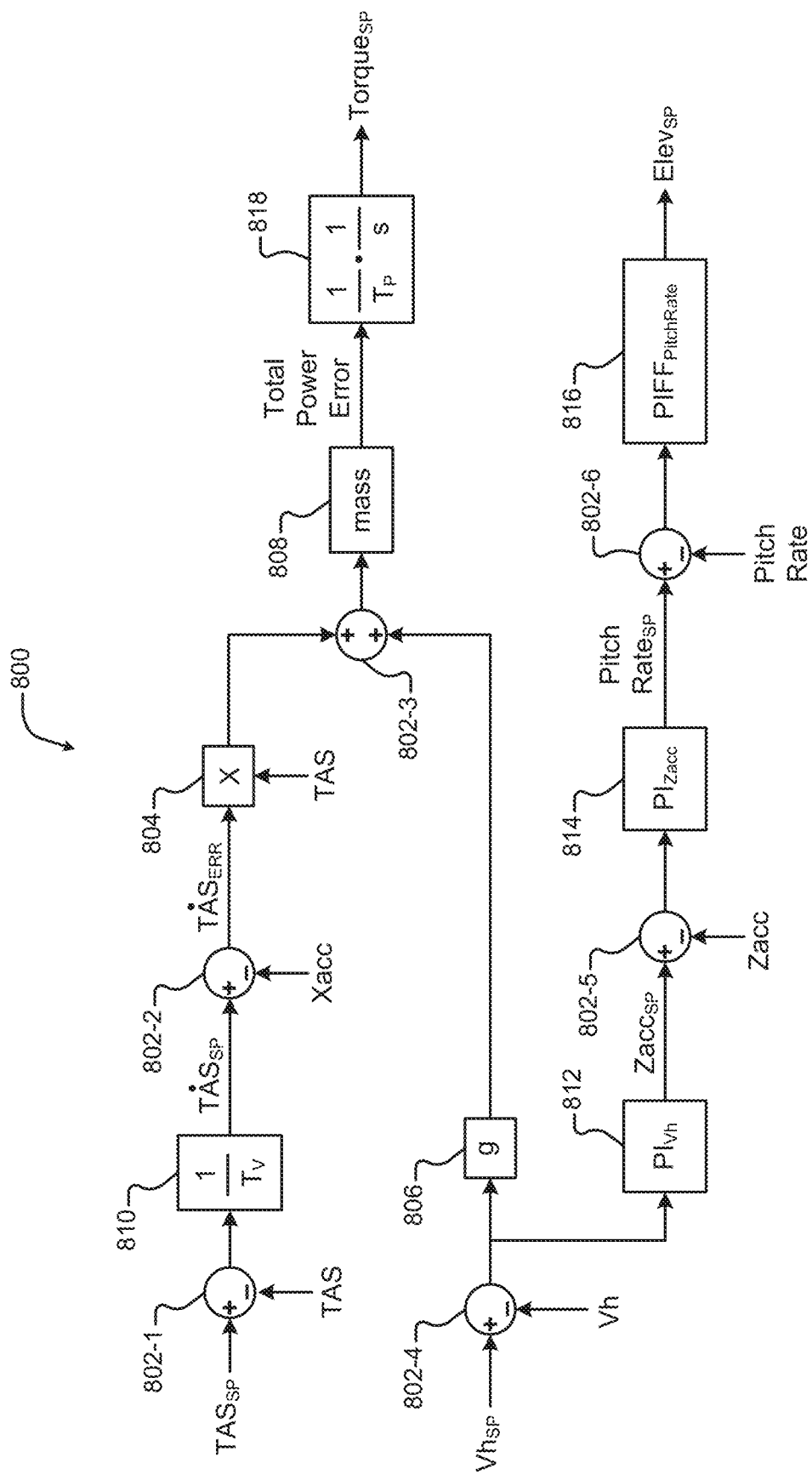
FIGS. 8-10 illustrate control block diagrams for example longitudinal control modules.
Figure 9:
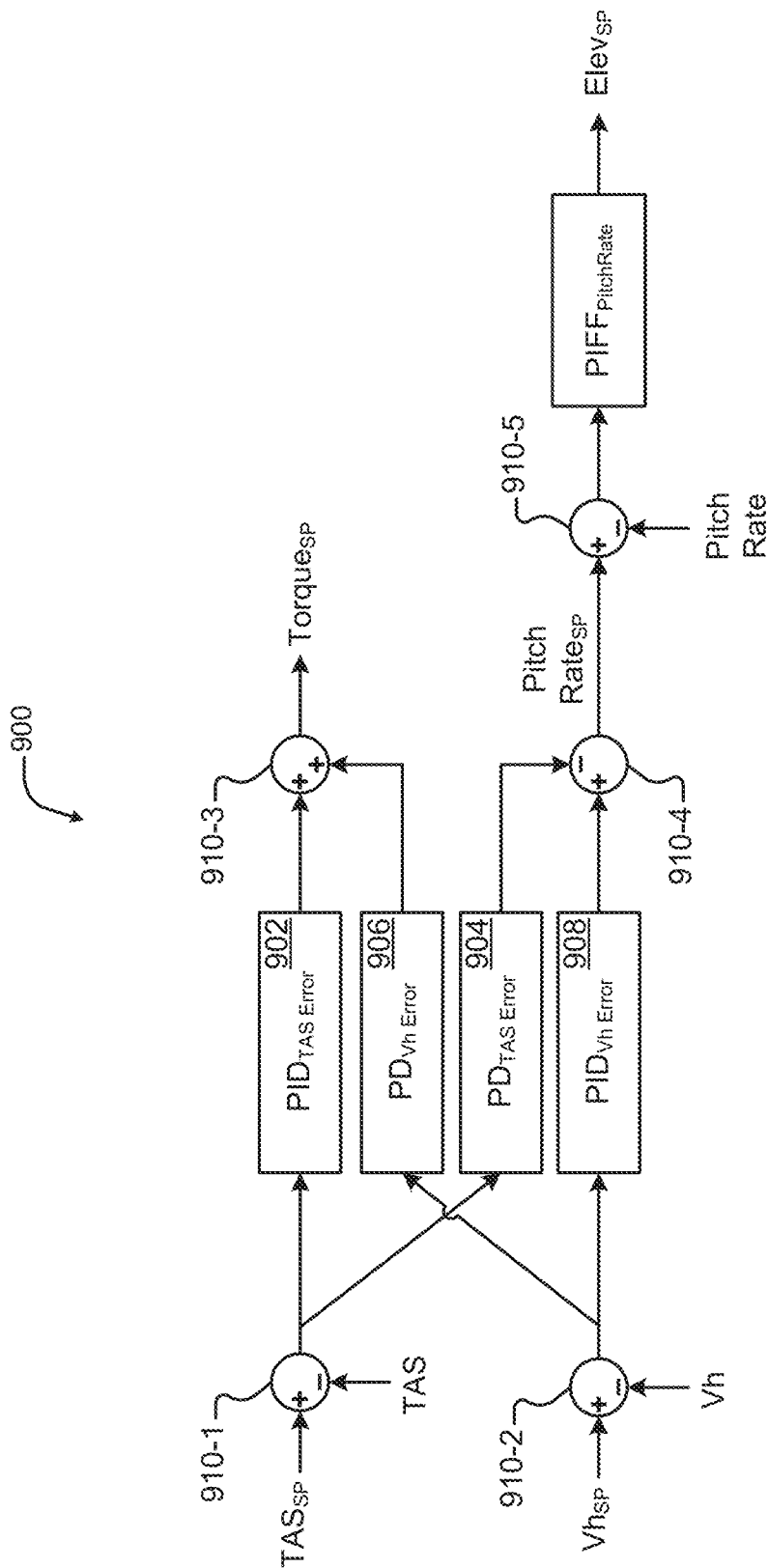
Figure 10:
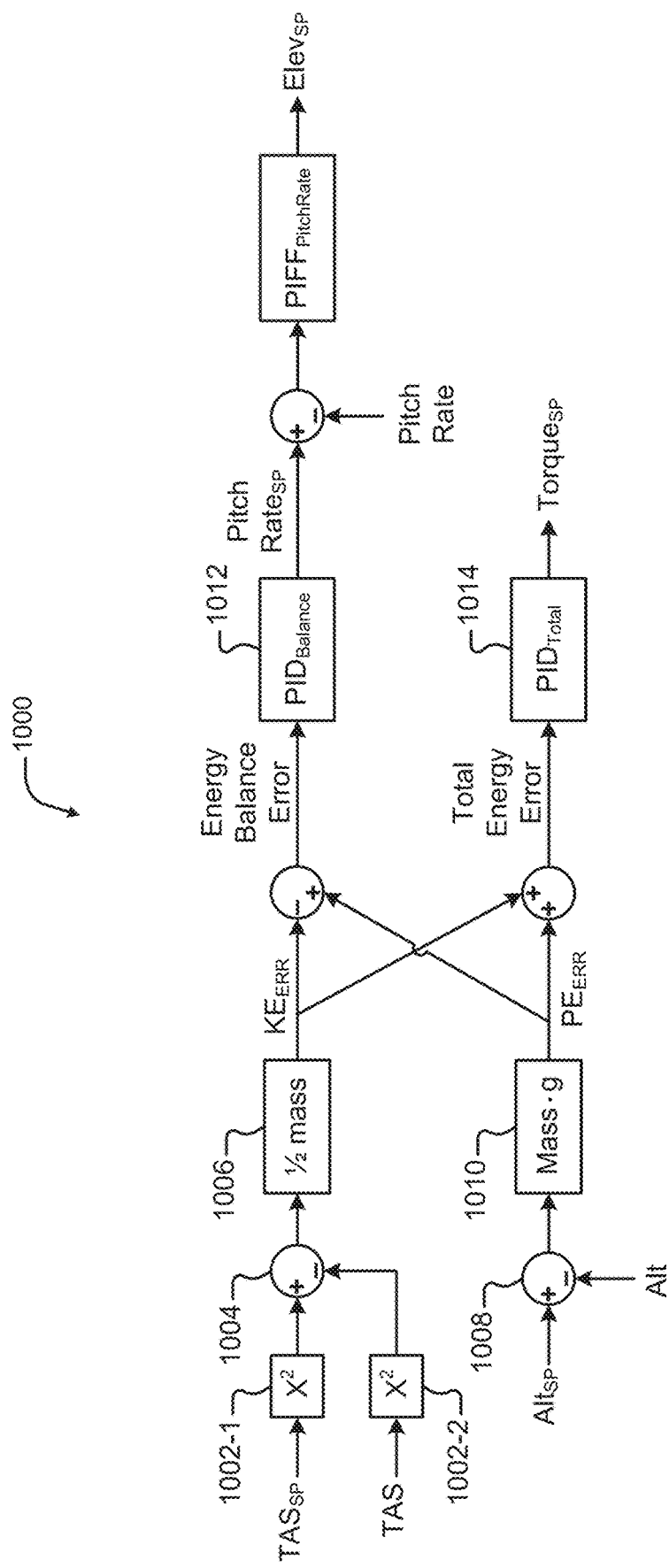
Figure 11:
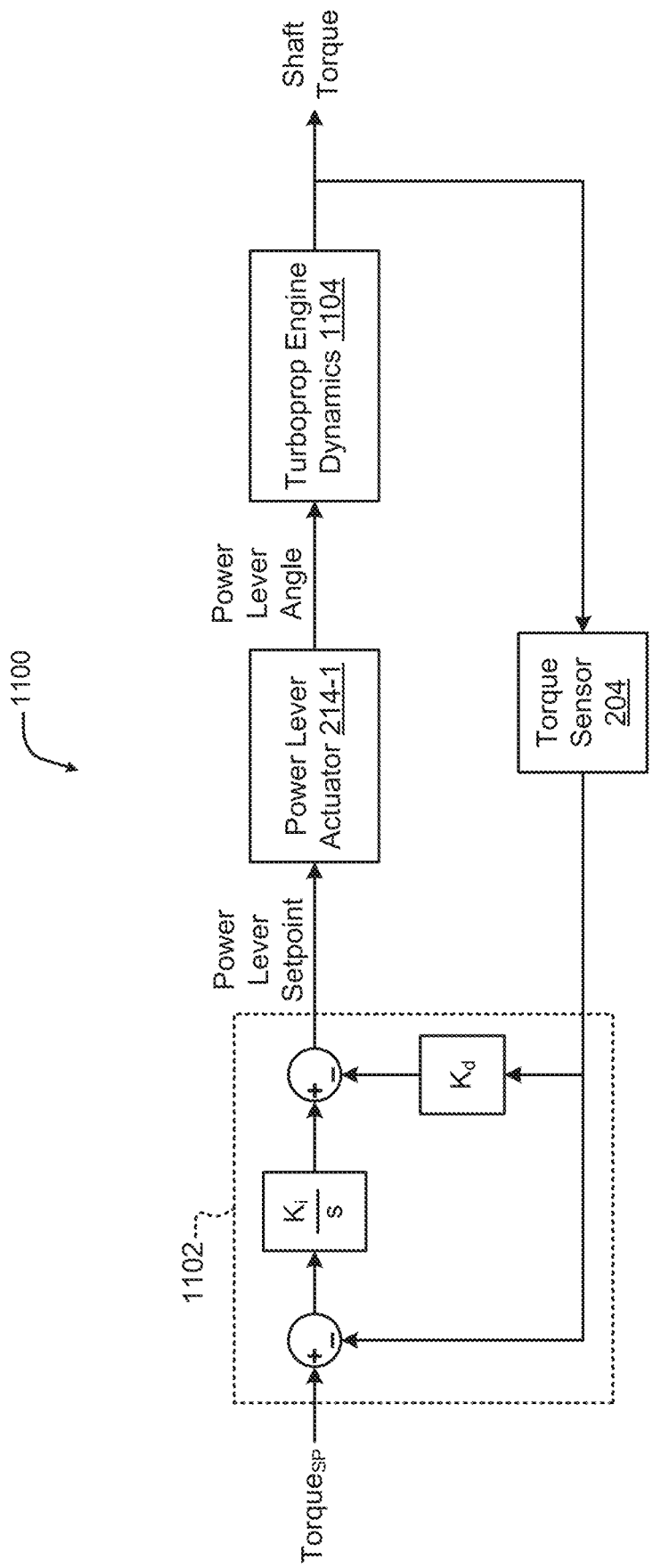
FIG. 11 illustrates a control block diagram for an example engine torque control module.
Figure 12:
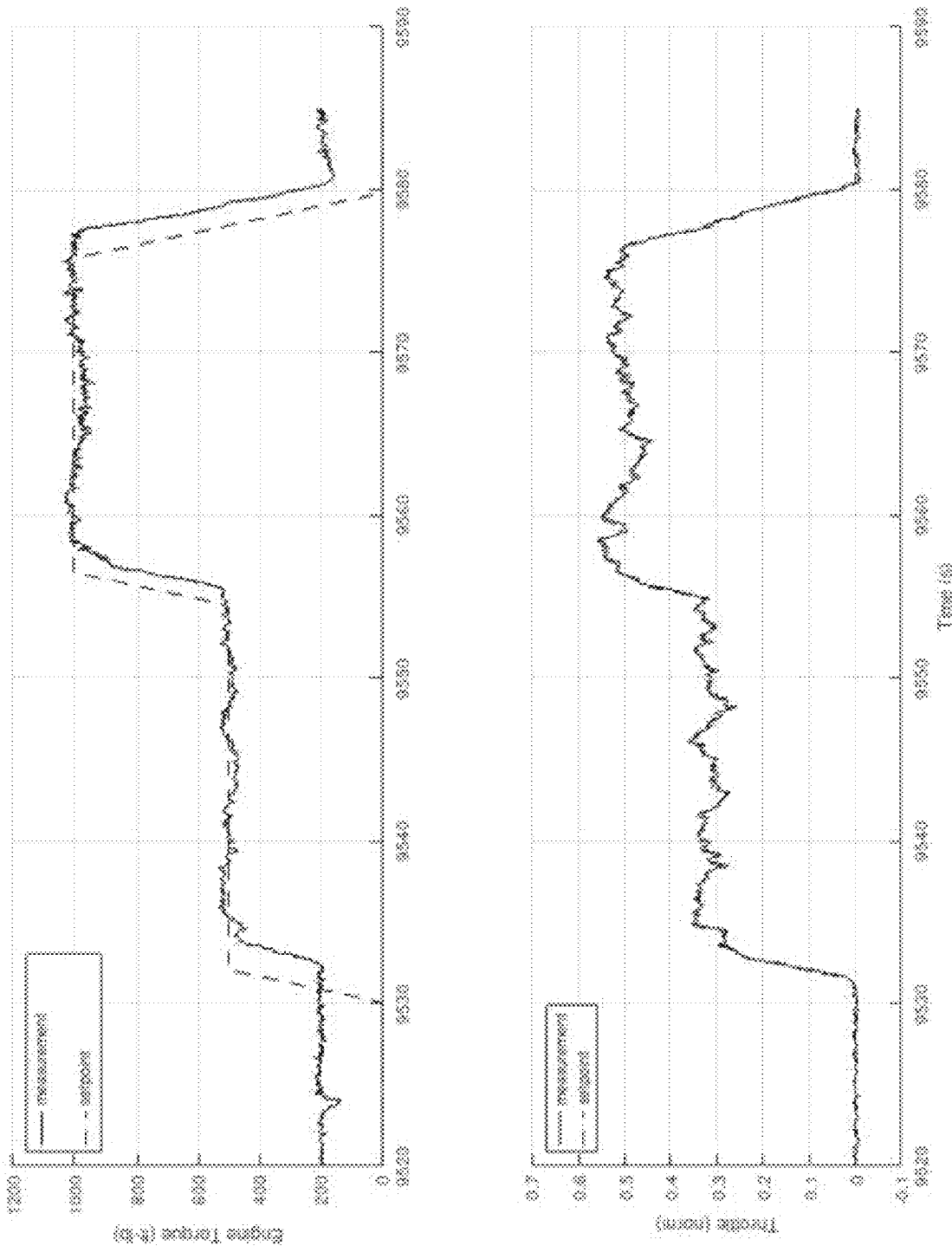
FIG. 12 illustrates example data acquired during a test of an engine torque control system.
Figure 13:
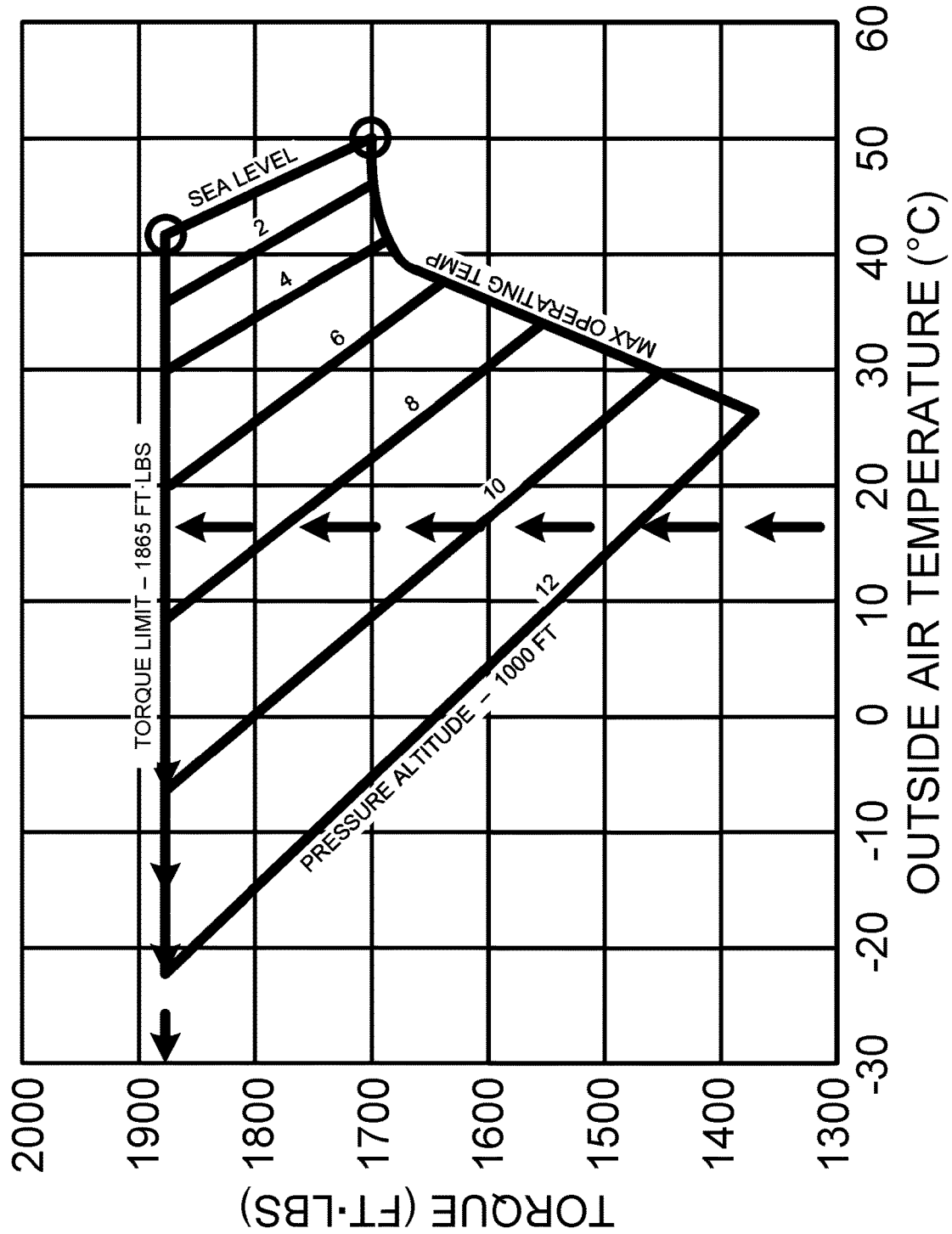
Figure 14:
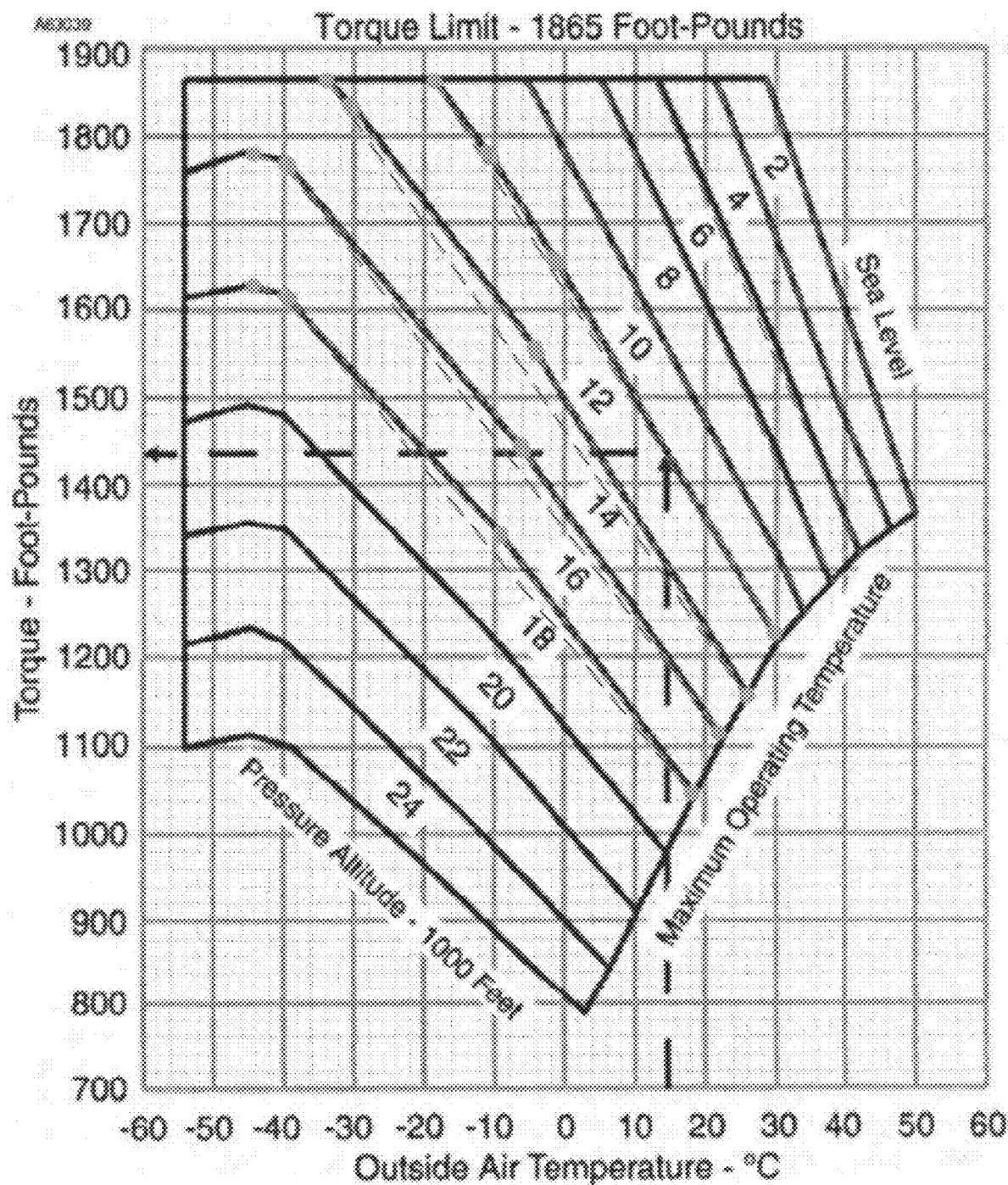

FIGS. 1A-11 illustrate example features of a flight control system that may incorporate engine torque feedback into a power control architecture. FIGS. 1A-1B illustrate an example environment that includes an aircraft (e.g., an unmanned aircraft) and a ground control station. FIG. 2 is a functional block diagram of an example aircraft. FIGS. 3-4 illustrate an example flight control system. FIGS. 5-6 illustrate example methods that describe operation of the flight control system. FIG. 7 illustrates a functional block diagram of an example torque limit determination module that may calculate a torque limit (e.g., a maximum torque value) for the engine torque control module. FIGS. 8-10 illustrate control block diagrams for an example longitudinal control module. FIG. 11 illustrates a control block diagram for an example engine torque control module. FIG. 12 illustrates example data acquired during a test of an engine torque control system implemented in a Cessna Caravan 208B. FIGS. 13-15 illustrate example engine torque limit tables/graphs for a Cessna Caravan 208B.

FIG. 1A illustrates an example environment that includes an unmanned aircraft 100 ("UA 100") that may implement a flight control system 200 that may incorporate engine torque feedback into a power control architecture. For example, the UA 100 may include an engine torque sensor/system 204 and an autopilot system 202 including a longitudinal control module 300 and an engine torque control module 302 that implement the control system of the present disclosure (e.g., see FIGS. 3-4).

FIG. 1A includes a plurality of airports 102 (e.g., an origin airport 102-1 and a destination airport 102-2), each of which may include a runway 104-1, 104-2 and an air traffic control (ATC) facility 106-1, 106-2 (e.g., an ATC tower). FIG. 1A also includes a ground control station 108 (GCS 108) and a base station 110. The UA 100 may be in communication with one or more GCSs 108, one or more base stations 110, and one or more ATCs 106 while en route from the origin airport 102-1 to the destination airport 102-2. In some implementations, the GCS 108 may also be referred to as an aircraft operations center ("AOC").

The UA 100 in FIG. 1A is illustrated as a fixed-wing aircraft (e.g., a Cessna Caravan 208B). Although the disclosure illustrates a fixed-wing aircraft, other types of aircraft may implement the techniques of the present disclosure. Other aircraft may include, but are not limited to, rotorcraft, vertical takeoff and landing aircraft (VTOL), and hybrid configurations, such as tilt-wing aircraft and electrical vertical takeoff and landing aircraft (eVTOL). The various aircraft may be used for a variety of purposes, such as cargo and/or passenger transport. Although runways 104 are illustrated in FIG. 1A, other touchdown areas may include, but are not limited to, a heliport, a vertiport, a seaport, moving touchdown areas (e.g., an aircraft carrier), and unprepared landing areas, such as emergency landing sites and package delivery sites.

In FIG. 1A, the UA 100 may communicate with a remote GCS 108 (e.g., via a data connection and/or via a radio relay located on the aircraft 100). The GCS 108 may monitor and/or control operation of the UA 100. For example, human operator(s) at the GCS may monitor/control UA operations. In a specific example, the GCS 108 may send flight commands (e.g., flight pattern data and other commands) to the UA 100 and receive data from the UA 100 and other sources (e.g., see FIG. 1B). In some implementations, human operator(s) at the GCS 108 may be in contact with ATC 106. The UA 100 may also communicate with ATC 106. For example, the human operator(s) and/or the UA 100 may communicate via radio with ATC.

In some implementations, the UA 100 and the GCS 108 may communicate via one or more communication base stations 110 that are located along the UA's route. For example, a base station 110 may relay data from the UA 100 to the GCS 108 and vice versa. In this example, a base station 110 may receive/transmit data from/to the UA 100 (e.g., via a line of sight link). The remotely located base station 110 may transmit/receive data to/from the GCS 108 via another communication link (e.g., the Internet). Although a single base station 110 is illustrated in FIG. 1A, multiple base stations may be located along the UA flight path. Using base stations along the flight path and/or at the airports 102 may help ensure that the UA 100 and the GCS 108 can communicate via one or more reliable communication links.

A remote operator/pilot (e.g., in the GCS 108) and/or an aircraft autopilot/autoflight system may control the UA 100. For example, in an autonomous/automated aircraft, the flight control system 200 may operate with remote operator/pilot input and/or without remote operator/pilot input. In a specific example, a remote operator/pilot and/or aircraft autopilot may control an aircraft according to a generated flight plan. In cases where the UA 100 includes autonomous flight capabilities, the UA 100 may take off and land by itself with minimal or no remote operator/pilot interaction. For example, a ground-based operator/pilot at the GCS 108 may generate and/or approve a flight plan that is uploaded to the UA 100. The UA 100 may then execute the flight plan by flying from a first airport 102-1 to a second airport 102-2. In some implementations, the aircraft 100 may automatically taxi and takeoff from the origin/departure airport, execute a flight plan, arrive at the destination/arrival airport, and automatically taxi to a final location at the destination airport after landing.

Although the aircraft 100 described herein may include unmanned aircraft, in some implementations, an aircraft may include an onboard operator/pilot. In these implementations, the aircraft may be referred to as an "optionally piloted aircraft" (OPA) when manned, but nominally controlled remotely and/or autonomously. In some implementations, the flight control system 200 described herein may be included in a more conventional aircraft such as a non-autonomous aircraft that requires a pilot.

Human operators in the GCS 108 and/or on the aircraft 100 may have different roles described herein, such as a remote operator/pilot or an onboard operator/pilot. In some cases, an operator may be referred to as a pilot if the operator meets specific qualifications and performs specific responsibilities. The remote or onboard operator/pilot may be referred to hereinafter as an operator or pilot. Additionally, the various human operator/pilot inputs and associated aircraft/GCS components may be referred to as operator or pilot components (e.g., operator I/O or pilot I/O in FIG. 1B).

FIG. 1B illustrates an example GCS 108 that may include one or more remote operators that monitor and/or control the UA 100. In some implementations, the GCS 108 may include a flight engineering station. One or more personnel in the flight engineering station may monitor aircraft operations (e.g., as additional monitoring resources), such as lower-level aircraft operations. In some implementations, data acquired by the flight engineering station may be used in further development/engineering of the UA 100, GCS 108, or other systems. Although a single GCS may control one or more UAs, in other implementations, multiple GCSs may handle monitoring/control of a single UA over a single flight (e.g., via handoffs between GCSs and/or base stations).

In FIG. 1B, a remote operator may control the UA 100 from the GCS 108 using GCS operator/pilot input/output (I/O) 112. The remote operator may view interfaces, such as graphical user interfaces (GUIs), on one or more displays 114 in the GCS 108. The GCS 108 includes a GCS-UA communication system 116 that communicates with the UA 100. For example, the GCS 108 may communicate with the UA 100 via a data connection and/or via a radio relay. The GCS 108 may receive data acquired by the UA 100 (e.g., sensor data, navigation data, comm. data, and other data). The GCS 108 may monitor the UA 100 and/or control operation of the UA 100. The GCS 108 may send commands (e.g., pilot/autopilot commands) to the UA 100 that control the UA 100. The GCS 108 includes other GCS systems, devices, and modules 118 that may provide the functionality described herein, along with additional functionality associated with the GCS 108. For example, the other GCS systems, devices, and modules 118 may provide path planning functionality and other flight management system functionality for the UA 100.

Components of the aircraft 100 and/or GCS 108 that implement the torque feedback control described herein may be referred to generally as an engine torque control system. For example, the engine torque control system may include a longitudinal control module 300 and an engine torque control module 302. In some examples, the engine torque control system may include an engine torque sensor/system 204, such as an engine torque sensor and associated hardware/software that generates an engine torque value. In some examples, the engine torque control system may include operator/pilot I/O 112 on the aircraft and/or at the GCS 108, such as I/O that receives operator/pilot input (e.g., override commands) and reports various data associated with the engine torque control system.

In some implementations, the GCS 108 may include some features of the engine torque control system described herein. For example, the GCS 108 may receive data associated with the engine torque control system, such as setpoint values and measured values. The GCS 108 may also include an engine torque control interface for a remote operator to monitor the various setpoints and measured values. In some implementations, the GCS 108 may include engine torque control interfaces 120 (e.g., engine torque control GUIs 120 and/or manual interfaces) for sending commands to the aircraft 100. For example, the GCS 108 may include interfaces for commanding torque limits, such as a maximum torque limit value.

FIG. 2 is a functional block diagram of an example aircraft 100 (e.g., an autonomous or optionally piloted aircraft). The UA 100 of FIG. 2 includes: 1) sensors 206 (e.g., cameras, light detection and ranging systems (LIDAR), radar, etc.), 2) communication systems 208, 3) navigation systems 210, 4) a flight management system 212 (FMS 212), 5) a flight control system 200, 6) actuators 214, 7) an engine torque sensor/system 204, and 8) operator/pilot input/output (I/O) 112. The aircraft components illustrated in FIG. 2 are example aircraft components. Other aircraft including additional/fewer components may implement the engine torque control system described herein. For example, some components (e.g., cameras and LIDAR) may not be included in more conventional manned aircraft that implement the engine torque control system.

The UA 100 includes a navigation system 210 that generates navigation data. The navigation data may indicate the location, altitude, velocity, heading, and attitude of the UA 100. The navigation system 210 may include a Global Navigation Satellite System (GNSS) receiver that determines the latitude and longitude of the UA 100. The navigation system may also include an attitude and heading reference system (AHRS) that may provide attitude and heading data for the UA 100, including roll, pitch, and yaw. The navigation system 210 may include an air data system (e.g., a Pitot-static tube, air data computer, etc.) that may provide airspeed, angle of attack, sideslip angle, altitude, and altitude rate information. The navigation system 210 may include a radar altimeter and/or a laser altimeter to provide Above Ground Level (AGL) altitude information. The navigation system 210 may also include an inertial navigation system (INS).

The UA 100 may include a plurality of sensors 206 that generate sensor data, such as sensor data that can be used to detect other aircraft. For example, the UA 100 may include one or more radar systems, one or more electro-optical (E/O) cameras, one or more infrared (IR) cameras, and/or LIDAR. The LIDAR systems may measure distance to a target by illuminating the target with laser light and measuring the reflected light with a sensor. The radar systems and cameras may detect other aircraft. Additionally, the sensors (e.g., cameras and LIDAR) may determine whether the runway is clear when approaching for a landing. In some implementations, potential obstacles (e.g., surrounding air traffic and weather) may be identified and tracked using at least one of onboard radar, offboard radar, cameras, Automatic Dependent System-Broadcast (ADS-B), Automatic Dependent System-Rebroadcast (ADS-R), Mode C transponder, Mode S transponder, Traffic Collision Avoidance System (TCAS), Traffic Information Service-Broadcast (TIS-B), Flight Information Service-Broadcast (FIS-B), and similar services. The data from these sensors and services may be fused and analyzed to understand and predict the behavior of other aircraft in the air or on the ground.

The UA 100 may include one or more communication systems 208. For example, the UA 100 may include one or more satellite communication systems, one or more ground communication systems, and one or more air-to-air communication systems. The communication systems 208 may operate on a variety of different frequencies. In some implementations, the communication systems 208 may form data links. In some implementations, the communication systems 208 may transmit a flight pattern data structure to the GCS 108 and/or to the ATC 106. The communication systems 208 may gather a variety of information, such as traffic information (e.g., location and velocity of aircraft), weather information (e.g., wind speed and direction), and notifications about airport/runway closures. In some implementations, a voice connection (e.g., ATC communication over radio VHF) may be converted to text for processing. In some implementations, the UA 100 can broadcast their own position and velocity (e.g., to the GCS or other aircraft).

The UA 100 may include an FMS 212 that may receive and/or generate one or more flight pattern data structures (i.e., flight pattern data) that the UA 100 may use for navigation. A flight pattern data structure may include a sequence of waypoints that each indicate a target location for the UA 100 over time. A waypoint may indicate a three-dimensional location in space, such as a latitude, longitude, and altitude (e.g., in meters). Each of the waypoints in the flight pattern data structure may also be associated with additional waypoint data, such as a waypoint time (e.g., a target time of arrival at the waypoint) and/or a waypoint speed (e.g., a target airspeed in knots or kilometers per hour). In some implementations, a flight pattern data structure may include other trajectory definitions, such as trajectories defined by splines (e.g., instead of discrete waypoints) and/or a Dubins path (e.g., a combination of a straight line and circle arcs). In some implementations, the flight pattern data structure may include additional flight parameters, such as a desired flap position. The flight pattern data structure may be generated for different phases of flight, such as departure, climb, cruise, descent, and approach.

A remote operator, autopilot, and/or onboard pilot may control the UA 100 according to the generated flight pattern data structure. For example, a flight pattern data structure may be used to land the UA 100, takeoff from a runway, navigate en route to a destination, and/or hold the UA 100 in a defined space. In some implementations, the flight pattern may be displayed to the remote operator in the GCS 108 on a display 114 so that the remote operator may follow the flight pattern.

The FMS/GCS 212, 108 may acquire a variety of types of data for use in generating a flight pattern data structure. Example data may include, but is not limited to, sensor data (e.g., vision-based data and radar data), navigation data (e.g., GNSS data and AHRS data), static data from databases (e.g., an obstacle database and/or terrain database), broadcasted data (e.g., weather forecasts and notices to airmen), and manually acquired data (e.g., pilot vision, radio communications, and air traffic control inputs). Additionally, the FMS 212 (e.g., an avoidance system) may detect, track, and classify surrounding traffic as well as predict surrounding traffic behavior.

In some implementations, the GCS/UA 108, 100 may include traffic classifier functionality that may detect, track, and classify surrounding traffic, as well as predict their behavior. The traffic classifier may receive data that includes ADS-B data, TIS-B data, TCAS data, Mode C data, Mode S data, camera data, LIDAR data, radar data, and other traffic data. The traffic classifier may output traffic classification data that includes tracking data that indicates a location and direction of other aircraft, along with additional data that characterizes the other aircraft, such as the other aircraft's predicted runway and current leg. Traffic classification data can be used to select the runway, pattern plan, and to avoid other aircraft.

The FMS 212 may include an ATC manager module and a weather manager module. The ATC manager module may acquire ATC information. For example, the ATC manager module may interact with and request clearances from the ATC via VHF, satellite, and/or a data connection (e.g., the Internet). ATC traffic information may provide guidance and/or clearances for various operations in controlled airspace. The information from the ATC may come from a radio using speech-to-text recognition or a digital data-link, such as Controller Pilot Data Link Communications (CPDLC) or from the Unmanned Traffic Management (UTM) System. The weather manager module may acquire the current and future weather information in the vicinity of the destination airport as well as any other source for weather in between the current location and the destination airport. The weather information can be provided via satellite, Internet, VHF, onboard weather radar, and Flight Information Services-Broadcast (FIS-B). The information from these and other sources may be fused to provide a unified representation of wind, precipitation, visibility, etc.

The UA 100 may include other systems that aid in autonomous/unmanned flight. For example, an avoidance system (e.g., detect and avoid system (DAA)) may be implemented by the FMS 212 and/or GCS 108. The avoidance system may assist the remote pilot in navigation and avoidance of conflict zones (e.g., loss of separation). For example, the avoidance system may generate avoidance GUIs on displays included in the operator/pilot I/O 112. The operator/pilot may control the UA 100 using the pilot controls 122 included in the pilot I/O 112. In some implementations, the flight control system 200 (e.g., an autopilot 202) may control the UA 100.

The FMS 212 may include additional planning modules for en route planning, taxiing, and/or holding. The FMS 212 may also include modules for vehicle management, such as optimizing fuel and trajectory based on the performance of the UA 100. In some implementations, the FMS 212 may also include a contingency/emergency management module. The features included in the FMS 212 may vary, depending on the type of aircraft and the specific features of the aircraft.

The UA 100 includes a flight control system 200 that generates actuator commands based on a received flight pattern data structure and current operating conditions. The flight control system 200 may include a guidance module 216, an autopilot system 202, and an actuator control system 218. The flight control system illustrated and described in FIGS. 2-6 is only an example flight control system. As such, other flight control systems including additional/alternative components may be implemented according to the techniques of the present disclosure.

The flight control system 200 may generate control commands that control the UA 100. For example, the flight control system 200 may generate commands that control the actuators and the engines (e.g., via an engine controller). The flight control system 200 may control the UA 100 according to remote operator inputs from the GCS operator controls 122 and/or commands generated by the FMS 212 (e.g., autopilot commands). For example, the flight control system 200 may control the UA 100 according to flight pattern data that is generated remotely by the GCS 108 and/or locally by the FMS 212.

The FMS 212 may include a guidance module 216. The guidance module 216 may receive the flight pattern data structure and additional information regarding the state of the UA 100, such as a current location (e.g., a latitude/longitude/altitude), velocity, and aircraft attitude information. Based on the received information, the guidance module 216 may generate autopilot commands for the flight control system 200. Example autopilot commands may include, but are not limited to, a heading command, a desired airspeed command, a desired altitude command, and a roll command.

The flight control system illustrated and described with respect to FIGS. 3-4 is only an example flight control system. As such, a flight control system of the present disclosure may be implemented using additional/alternative modules, controllers, and systems. For example, although the flight control system 200 includes a guidance module 216, a longitudinal control module 300, an engine torque control module 302, and an actuator control system 218, the flight control system 200 may be implemented using additional/alternative modules, controllers, and systems. In one example, the longitudinal control module 300 may be replaced with one or more modules/controllers that generate desired elevator position and desired torque based on desired altitude and desired airspeed. For example, an alternative control system may include a first module/controller that generates desired elevator position based on desired altitude. In this example, a second module/controller may generate desired torque based on desired airspeed.

The flight control system 200 may include an autopilot system 202 and an actuator control system 218 that control the UA 100 based on autopilot commands received from the guidance module 216. For example, the autopilot system 202 and the actuator control system 218 may output control signals/commands that control actuators 214 (e.g., power lever actuators for one or more engines, elevator actuator, etc.). In a specific example, the output of the autopilot system 202 and the actuator control system 218 may include actuator position commands that control a variety of aircraft parameters, such as heading, speed, altitude, vertical speed, roll, pitch, and yaw of the aircraft.

In some implementations, the UA 100 may include an engine controller that controls one or more engines, such as turboprop engines or other engine types. The engine controller may control the engine(s) based on received engine commands, such as a power command (e.g., a power lever position command). For example, the engine controller may control fuel and other engine parameters to control the engines according to the received engine commands. In some implementations, the engine controller may include a full authority digital engine control (FADEC) that controls the engines. Example engines may include, but are not limited to, a piston engine, turboprop, turbofan, turbojet, jet, and turboshaft. In some implementations, the UA 100 may include one or more electric motors. In some implementations, the UA 100 may include a propeller system. In these implementations, a lever may control the pitch/RPM of the propeller.

The autopilot system 202 may receive autopilot commands from the FMS 212 and/or the operator/pilot controls 122 (e.g., from the GCS 108 and/or an onboard pilot). The autopilot system 202 may operate in a plurality of different modes. In one example mode, the autopilot 202 receives data (e.g., a flight pattern data structure) from the FMS 212 and the autopilot controls the aircraft 100 according to the data received from the FMS 212. In another mode, a remote operator may use remote operator controls 122 (e.g., on a control panel/screen at the GCS 108) to generate control inputs for the autopilot 202. For example, the autopilot 202 may receive commands from the remote operator controls that provide the autopilot 202 with at least one of 1) a desired altitude, 2) a desired heading, 3) yaw damper (e.g., to coordinate the turns with the rudder), 4) a desired airspeed (e.g., using engine control), 5) a desired climb/descent rate, and 6) a desired holding pattern. The autopilot 202 may control the aircraft 100 according to the received commands.

The UA 100 may include a plurality of control surfaces. Example control surfaces may include, but are not limited to, ailerons, tabs, flaps, rudders, elevators, stabilizers, spoilers, elevons, elerudders, ruddervators, flaperons, landing gears, and brakes for fixed-wing aircraft. Rotorcraft may include other controls/surfaces (e.g., rotor collective, cyclic, and tail rotor). The UA 100 can include actuators/linkages that control the control surfaces based on the commands generated by the remote operator controls 122 and/or the autopilot 202. The actuators and linkages may vary, depending on the type of aircraft.

The flight control system 200 may generate a power command/value (e.g., a power lever position command) that controls the thrust output of the engine(s). In some implementations, the aircraft 100 may include a manual power lever. In some cases, the flight control system 200 may move the power lever using a power lever actuator 214-1. In these cases, the position of the power lever and/or the power lever position command itself may be acquired by the engine(s) (e.g., an engine controller). In some implementations, such as autonomous aircraft, a manual power lever may not be included in the aircraft. In these implementations, the flight control system 200 may send the power command/value to the engines (e.g., an engine controller). In some implementations, the aircraft may include an autothrottle system.

The flight control system 200 may receive an engine torque value that indicates a current measured engine torque.

In some implementations, the aircraft 100 may include an engine torque sensor/system 204 that generates the engine torque value. In some implementations, the engine torque sensor/system 204 may include an aircraft torquemeter. In one example, an aircraft torquemeter may measure the angular deflection (e.g., twist) that occurs in the torque shaft. In another example, an aircraft torquemeter may use a helical ring gear to generate oil pressure proportional to the torque applied to the shaft. The torque sensor/system 204 may generate a signal (e.g., voltage, pressure, or other signal) that may be digitized (e.g., a digital engine torque value) for use by a flight computer. A variety of torque sensors/systems may be implemented (e.g., hydraulic torque sensing, electronic torque sensing, etc.) in the engine torque control system.

The aircraft may include different types of engine torque sensors/systems, depending on the implementation. For example, the types of engine torque sensors/systems used may depend on the type of engine included in the aircraft. In some implementations, the engine torque sensors/system may be included in the manufactured aircraft (e.g., at the manufacturing facility). In other implementations, the engine torque sensors/systems may be provided for fitting onto an existing aircraft. Although a single engine aircraft is illustrated and described herein, the flight control system 200 may be implemented on an aircraft including multiple engines and multiple engine torque sensors/systems.

The GCS/UA 108, 100 may include interfaces for the remote/onboard pilot, referred to herein as pilot input/output (I/O) devices 112 and/or HMI. The operator/pilot I/O 112 may include operator/pilot controls 122, one or more displays 114, and additional interfaces 124. The operator/pilot controls 122 may include devices used by the remote/onboard pilot to control the UA 100, such as a flight yoke, power lever, manual buttons/switches, and other controls. The displays 114 can display one or more GUIs. Additional interfaces 124 may include audio interfaces (e.g., speakers, headphones, microphones, etc.), haptic feedback, and other I/O devices, such as readouts, gauges, and additional interfaces.

The displays 114 may include a variety of display technologies and form factors, including, but not limited to: 1) a display screen (i.e., monitor), such as a liquid-crystal display (LCD) or an organic light emitting diode (OLED) display, 2) a HUD, 3) a helmet mounted display, 4) a head mounted display, 5) augmented reality glasses/goggles, and/or 6) a standalone computing device (e.g., a tablet computing device). The displays 114 may provide different types of functionality. In some implementations, a display may be referred to as a primary flight display (PFD). The PFD may display a variety of information including, but not limited to, an attitude indicator, an airspeed indicator, an altitude indicator, a vertical speed indicator, a heading, and navigational marker information. In some implementations, a display may be referred to as a multi-function display (MFD). An MFD may refer to an auxiliary display/interface that may display a variety of data, such as a navigation route, in conjunction with a primary flight display. The GCS/UA 108, 100 may include different types of displays that include GUIs that are rendered based on a variety of data sources (e.g., sensors, navigation systems, communication systems, pilot input, etc.). The different displays and GUIs described herein are only examples.

The operator/pilot I/O 112 in the UA/GCS 100, 108 may display information associated with the flight control system 200. For example, the operator/pilot I/O 112 may display the various input/output data and calculated values described herein (e.g., a desired power lever position, power command limit, etc.). In some implementations, the UA 100 may send the information for display to the GCS.

FIG. 3 illustrates an example flight control system 200. The flight control system 200 includes a guidance module 216, an autopilot system 202, and an actuator control system 218. The guidance module 216 may generate autopilot commands (e.g., desired airspeed and desired altitude) based on received flight pattern data. The autopilot system 202 may generate a desired torque value and a desired elevator position based on the autopilot commands and actual airspeed/altitude. The autopilot system 202 may generate a desired power lever position based on the desired torque value and the current engine torque value. The actuator control system 218 may use the desired power lever position to generate a power lever position command that controls a power lever actuator 214-1. Additionally, the actuator control system 218 may generate other actuator commands (e.g., an elevator position command) that control other aircraft actuators 214-2, 214-3.

In some cases, desired values may be referred to herein as setpoint values or desired setpoint values. For example, a desired airspeed value may also be referred to as an airspeed setpoint value (e.g., $Airspeed_{SP}$). As another example, a desired altitude value may be referred to as an altitude setpoint value (e.g., $Alt_{SP}$). As another example, a desired torque value may be referred to as a torque setpoint value (e.g., $Torque_{SP}$). As another example, a desired elevator position value may be referred to as an elevator setpoint value (e.g., $Elev_{SP}$). As another example, a desired power lever position may be referred to as a power lever setpoint (e.g., $PwrLvr_{SP}$) or other desired power/setpoint value. In some cases, actual values may refer to measured values that are measured/calculated by the aircraft systems.

In the flight control system 200 of the present disclosure, the longitudinal control module 300 provides outputs for desired elevator position and desired engine torque. The desired torque may be achieved through a closed-loop torque algorithm (e.g., the engine torque control module 302) that produces the desired power lever position. Additionally, the engine torque control module 302 may also serve as a monitor that outputs a power command limit setting associated with a maximum safe engine torque at the current operating conditions. In some implementations, the power command limit may be updated in real-time and can be shared with other parts of the aircraft system (e.g., other controllers, modules, and/or actuators). For example, in FIG. 3, the calculated power command limit is sent to the actuator control system 218 and may be stored (e.g., logged) as a back-up power command limit that may be used in the event of an engine torque sensor failure.

As described herein, the flight control system 200 may include an autothrottle control architecture where the inner loop is a closed-loop torque algorithm. In this architecture, overtorque may be prevented by limiting the engine torque setpoint to respect engine torque limits. Any time that a maximum engine torque maneuver is commanded, the flight control system 200 may record information about the power command limit and the current operating conditions. The recorded data may be used in a feedforward component of the torque control algorithm for faster response and reduced lag. The recorded data may also be used by other modules in real-time or used to better understand how the engine operates through post-processing. In the event of an engine torque sensor/system failure, the previously found power setting at maximum torque can inform a back-up system, such that autothrottle can still be used in the degraded system state.

The guidance module 216 receives flight pattern data and generates autopilot commands based on the flight pattern data. Example autopilot input commands/values may include a desired airspeed, a desired altitude, and other commands/values. The flight pattern data can be generated onboard on the FMS 212 and/or received from the GCS 108.

The autopilot system 202 may include the longitudinal control module 300 and the engine torque control module 302. The longitudinal control module 300 may generate a desired elevator position and a desired torque value based on the desired airspeed and desired altitude relative to actual airspeed and actual altitude. The engine torque control module 302 may generate a desired power lever position based on the desired torque value and an engine torque value generated by the engine torque sensor/system 204. In some implementations, the desired torque value may be limited (e.g., to prevent overtorque, to improve efficiency, to extend engine life, or for other reasons). In some implementations, the limit on desired torque may vary as a function of flight conditions and flight mode (e.g., phase of flight).

In some implementations, airspeed and altitude control may be closely coupled to one another. For example, a change in power lever position (e.g., engine power setting) may affect both the altitude and airspeed of the aircraft 100. The longitudinal control module 300 may also be referred to as an energy management module because changes to the aircraft's altitude and airspeed can be thought of as changes to the system's kinetic and potential energy.

The longitudinal control module 300 may determine desired elevator position and desired torque based on the desired airspeed, desired altitude, actual airspeed, and actual altitude. In some implementations, the longitudinal control module 300 may implement one or more controllers that determine the desired elevator position and the desired torque. For example, FIG. 4 illustrates an example longitudinal control module 300 that includes an airspeed controller 400, an altitude controller 402, a climb rate controller 404, and a pitch rate controller 406. The combination of these controllers may output desired torque and desired elevator position.

The engine torque control module 302 may determine desired power lever position based on a desired torque value and measured engine torque value. In some implementations, the engine torque control module 302 may include an engine torque controller 408 that outputs the desired power lever position. The engine torque control module 302 may also include a power command limit determination module 410 that determines a power command limit associated with aircraft operating conditions. For example, the power command limit determination module 410 may determine when a maximum torque limit is reached. The power command limit determination module 410 may output a power command limit value associated with the maximum torque condition. Additionally, the power command limit determination module 410 may store the power command limits for different conditions.

The modules and controllers described herein may implement one or more types of controllers. For example, the controllers may implement one or more proportional-integral-derivative (PID) controllers and/or other types of controllers, such as optimal control schemes, robust control schemes, etc. In some implementations, controllers may include windup prevention, fault tolerance, backlash compensation, etc.

The autopilot system 202 illustrated in FIGS. 3-4 is only an example autopilot system. As such, autopilot systems that implement the flight control system of the present disclosure may include additional/alternative controllers and modules than those illustrated in FIGS. 3-4. For example, the autopilot system may include a lateral control module that controls turning, banking, and heading.

The flight control system 200 includes an actuator control system 218 that outputs actuator commands to actuators 214. The actuator control system 218 may also determine the current state (e.g., position) of actuators 214 based on feedback from the actuators 214. The actuator control system 218 may generate commands based on the desired state (e.g., position) of the actuators 214 and the actual state (e.g., positions) of the actuators 214. In FIG. 3, the actuator control system 218 may include electronic hardware/software that controls a power lever actuator 214-1, an elevator actuator 214-2, and other actuators 214-3 for other control surfaces.

In FIGS. 3-4, the actuator control system 218 includes a power lever actuator control 218-1 that generates a power lever position command based on a desired power lever position. A power lever actuator 214-1 (e.g., motor) may actuate a power lever (e.g., move a lever) based on the received power lever position command. For example, the power lever position command may cause the power lever to be moved towards the desired power lever position. The power command limit input into the actuator control system 218 may be used by the actuator control system 218 (e.g., the power lever actuator control 218-1) to control the limit to which the power lever is actuated by the power lever position command.

The actuator control system 218 may also include an elevator actuator control 218-2 that generates an elevator position command based on a received desired elevator position value. An elevator actuator 214-2 (e.g., motor) may move the aircraft elevator based on the received elevator position command. For example, the elevator position command may cause the elevator to be moved towards the desired elevator position. Additionally, other actuators 214-3 may actuate other aircraft control surfaces based on the other actuator commands generated by the flight control system 200 (e.g., other actuator controls 218-3).

In some implementations, a power command (e.g., the power lever position command) may move the physical power lever in the aircraft. In turn, movement of the physical power lever may cause the engine to increase/decrease power output. In some implementations, the power lever position command may be provided as a signal that controls the engine power output. Although the power lever position command may move the physical power lever, in some implementations, the power lever position command may be provided to the engine without moving a power lever. In some unmanned aircraft, a physical power lever for a pilot may be absent from the aircraft.

In some implementations, the autopilot system 202 and the actuator control system 218 may be configured to control a single engine. For a single engine: 1) the longitudinal control module 300 may generate a desired torque value for the single engine, 2) the engine torque control module 302 may generate a desired power lever position based on the desired torque value and a measured engine torque value for the single engine, and 3) the actuator control system 218 may generate a power lever position command for a power lever actuator 214-1 that actuates a single power lever. In implementations where the aircraft includes multiple engines, the aircraft may include multiple engine torque sensors/systems that measure torque for each engine. Additionally, the aircraft may include multiple power levers that control corresponding engines. As such, for multiple engines: 1) the longitudinal control module 300 may generate a desired torque value for each engine, 2) the engine torque control module 302 may generate a desired power lever position for each power lever based on the corresponding desired torque values and measured engine torque values, and 3) the actuator control system 218 may generate a power lever position command for each power lever actuator.

FIG. 5 illustrates a method that describes example operations performed by the flight control system 200 of the present disclosure. The method of FIG. 5 is described with reference to the flight control system 200 of FIGS. 3-4. Although the method blocks illustrated herein are illustrated in sequence, the timing of the operations described in the methods are not necessarily sequential. For example, the method blocks may be performed in a different order and/or performed at the same time.

In block 500, the longitudinal control module 300 receives the desired airspeed and the actual airspeed. In block 502, the longitudinal control module 300 receives the desired altitude and the actual altitude. In block 504, the longitudinal control module 300 determines the desired torque and the desired elevator position based on at least one of the desired airspeed, the desired altitude, the actual airspeed, and the actual altitude.

In block 506, the engine torque control module 302 determines the desired power lever position based on the desired torque. In some implementations, the engine torque control module 302 may also determine the power command limit. In block 508, the power lever actuator control 218-1 generates a power lever position command based on the desired power lever position. In some cases, such as near/during overtorque conditions, the power lever actuator control 218-1 may take into account the power command limit when generating the power lever position command. In block 510, the elevator actuator control 218-2 generates the elevator position command based on the desired elevator position value.

The flight control system 200 may use one or more torque limits. For example, the flight control system 200 may include a max torque value that should not be exceeded. In some implementations, the flight control system 200 may include additional torque limits, such as upper/lower torque limits that are associated with specific maneuvers. For example, while landing, a landing torque limit/range (e.g., upper/lower torque limits) may be implemented. The one or more torque limits may be provided by the aircraft manufacturer (e.g., in the aircraft manual). The one or more torque limits may be stored in the flight control system 200 (e.g., the engine torque control module 302 and/or a torque limit determination module 700).

The flight control system 200 (e.g., a power command limit determination module 410) may store data for multiple max torque scenarios. For example, the flight control system 200 may store the power lever values and other conditions over time that lead to maximum torque scenarios. In cases where multiple maximum torque scenarios have been mapped, the flight control system 200 (e.g., the power command limit determination module 410) may generate predicted data (e.g., a function/equation) that can be used to predict the occurrence of future max torque scenarios before the conditions occur. Example predicted data may include sets of conditions and associated power command limits that may cause a max torque scenario.

The stored conditions mapping engine torque to power lever and flight conditions may be used to generate a predictive or feed-forward component to the torque control for faster, more accurate, reduced-lag tracking of the desired torque command. In some implementations, the stored conditions may be used to compute power commands as a function of desired torque when torque feedback is lost/unavailable due to sensor failure or other issues. In some implementations, the stored conditions may be used to limit power commands to prevent overtorque when torque feedback is lost due to sensor loss/failure or other failure that causes a loss/failure to acquire accurate engine torque values.

The engine torque control module 302 may output the current power command limit to other components in the aircraft (e.g., the actuator control system 218) and/or to the GCS 108. The GCS 108 and other components in the aircraft 100 may benefit from knowledge of the power command limit based on current operating conditions. In some implementations, in the event of torque sensor failure, the previously found power command limit may be used as an estimate.

FIG. 6 illustrates a method that describes example operations performed by the flight control system 200 with respect to setting and updating power command limits. The method of FIG. 6 is described with reference to the flight control system 200 of FIGS. 3-4. In block 600, the maximum allowable torque value is set for the flight control system 200 (e.g., by the user). As described herein, multiple maximum torque values may be used in some implementations. In block 602, the initial maximum power command limit value is set in the flight control system 200 (e.g., by the user). In some implementations, the initial maximum power command limit value may be an estimated value set by the user. The power command limit value may be updated during an initial max torque scenario. The maximum allowable torque and the initial maximum power command limit values may be set by the user preflight (e.g., before a first aircraft flight).

In block 604, the engine torque control module 302 may provide the power command limit to the GCS 108 and/or other aircraft components. In block 606, the engine torque control module 302 reads in a desired torque value and drives the system to achieve the desired torque. In block 608, the engine torque control module 302 determines whether the current maneuver requires maximum torque. If the current maneuver does not require maximum torque, the engine torque control module 302 may continue driving the system to achieve the desired torque. If the current maneuver causes the engine torque value to reach the maximum torque, the engine torque control module 302 may update the power command limit to the current power command limit and store conditions in block 610.

Referring to FIG. 7, in some implementations, the engine torque control system (e.g., flight control system 200) may include a torque limit determination module 700 ("limit determination module 700") that determines the torque limit value. In some implementations, the limit determination module 700 may determine the torque limit value based on a variety of parameters including, but not limited to, outside air temperature (OAT), pressure altitude, and phase of flight. In some implementations, the limit determination module 700 may use a selected torque limit lookup table to determine the torque limit value. For example, the torque limit lookup table may provide a torque limit value for an OAT value and a pressure altitude value based on the current phase of flight. Additional factors that may affect the torque limit may include flap position/operation and operator override commands.

The limit determination module 700 includes a torque limit output module 702 that may output the torque limit value based on a variety of factors described herein. In some implementations, the torque limit output module 702 may determine the torque limit based on a current phase of flight using a lookup table associated with the current phase of flight, where the lookup table may provide a torque limit value based on an OAT value and a pressure altitude value. Example torque limit lookup tables 704 included in FIG. 7 include a takeoff table 704-1, a climb table 704-2, and a cruise table 704-3. In some implementations, the torque limit lookup tables 704 for different phases of flight may be based on torque limit values provided by the manufacturer of the aircraft 100. In some implementations, the takeoff torque limits may allow for the highest power output, but may result in an overtemperature condition (e.g., a turbine overtemperature) if used in a sustained climb.

A phase determination module 706 may determine a phase of flight. Example phases of flight may include, but are not limited to: 1) takeoff, 2) climb, 3) cruise, 4) descent, 5) approach, and 6) landing abort/go around. The phase determination module 706 may determine phases of flight in a variety of manners, depending on the phase. In one example, the phase determination module 706 may determine that the current phase of flight is a takeoff phase based on an autotakeoff operator command, takeoff mission waypoint type, and/or weight on wheels/on-ground detection logic. In another example, the phase determination module 706 may determine that the current phase of flight is a climb phase based on a timeout of takeoff phase (e.g., a 5 min timeout), an altitude operator command, a vertical speed operator command, a mission waypoint altitude, and/or a mission waypoint climb rate. In another example, the phase determination module 706 may determine that the current phase of flight is a landing abort/go around phase based on automated landing error thresholds (e.g., vertical speed, lateral error, altitude error, airspeed error), an obstacle detected on a runway, an abort/go around operator command, and/or an air traffic control instruction to abort/go around.

The torque limit output module 702 may select one of the stored torque limit tables 704 based on the determined phase of flight. For example, the torque limit output module 702 may select a torque limit table that corresponds to the determined phase of flight. In the example limit determination module 700 of FIG. 7, the torque limit output module 702 may map some of the tables to more than a single phase of flight. For example, the torque limit output module 702 may select a takeoff table to determine torque limits for a landing abort/go around phase. As another example, the torque limit output module 702 may select a cruise table for descent and approach phase torque limits.

FIGS. 13-15 illustrate example data that may be used to generate the torque limit tables 704 described herein. The example graphs/tables of FIGS. 13-15 may be graphs/tables for a Cessna Caravan 208B aircraft. FIG. 13 illustrates an example takeoff torque limit graph. FIG. 14 illustrates an example climb torque limit graph. FIG. 15 illustrates an example cruise maximum torque table.

The limit determination module 700 may include a flap monitoring module 708 that may monitor flap position and operation. In some implementations, the flap monitoring module 708 may influence torque limit transitions based on flap position and/or operation. For example, the flap monitoring module 708 may introduce a time delay (e.g., a one minute time delay) that prevents torque limit transitions in response to a change in flap position. In some cases, a time delay that prevents torque limit transitions from occurring immediately after a flap position change may prevent transient loss of altitude and/or airspeed (e.g., as a result to changes in available power).

In some implementations, an aircraft operator (e.g., a remote operator or onboard pilot) may override a torque limit. For example, an aircraft operator may command a new torque limit, such as a maximum torque limit value (e.g., a takeoff torque limit). As described herein, a maximum torque limit may be allowed during takeoff and during a landing abort. Otherwise, during normal flight, the torque limits may be limited to cruise and climb torque limits, which may be more conservative torque limits (e.g., lower torque limits). In cases where additional torque may be beneficial while more conservative torque limits are currently in effect, an operator may command an increase in the torque limit (e.g., to a takeoff torque limit). A command by the operator of a greater torque limit may be referred to as an "operator override torque limit." The torque limit output module 702 may output the operator override torque limit in response to the operator command.

In one scenario, an operator may command an operator override torque limit in response to instructions from ATC 106. For example, the operator may command an operator override torque limit in response to an ATC instruction to climb in altitude at a greater rate (e.g., as quickly as possible). In another scenario, an operator may command an operator override torque limit to perform an avoidance maneuver to avoid a possible collision or a detected/expected loss of separation between the aircraft and another object, such as another aircraft.

The operator/pilot interface 112 in the GCS/UA 108, 100 may include an "operator override interface" that is configured to receive an operator override command from the operator/pilot. For example, the operator override interface may include a GUI or other manual interface that may receive the operator override command. If a remote operator in the GCS 108 commands an operator override, the GCS 108 may transmit the operator override command to the UA 100.

The torque limit output module 702 may impose one or more restrictions on the torque limit associated with a length of time the torque limit may be set to a maximum torque limit value. The torque limit output module 702 may impose such restrictions to prevent overheating conditions (e.g., engine or other overheating conditions). In one example, the torque limit output module 702 may restrict operation of the aircraft 100 at the maximum torque limit (e.g., the takeoff torque limit) to less than a threshold period of time (e.g., less than 5 minutes). Additionally, or alternatively, the torque limit output module 702 may cease operation of the aircraft at the maximum torque limit (e.g., the takeoff torque limit) in response to detection of one or more aircraft temperatures that are greater than a threshold temperature (e.g., an engine temperature greater than a maximum allowed engine temperature threshold).

In some implementations, the torque limit output module 702 may implement a cooling off period after application of a maximum torque limit. For example, the torque limit output module 702 may be configured to refrain from instructing a maximum torque limit (e.g., a takeoff torque limit) for a threshold period of time after application of the maximum torque limit. In implementations including a cooling off period, an operator override interface may restrict the operator from providing an operator override command during the cooling off period. After the cooling off period, the operator override interface may again receive an operator override command.

In some implementations, the flight control system 200 may collect data associated with engine performance (e.g., engine torque values), power lever position, and other conditions. For example, the flight control system 200, or other system, may include data logging functionality (e.g., other modules/controllers of FIG. 4). A user may use the collected data to update the flight control system 200 for the UA 100 over time. For example, a user may use a computing device to download and process the collected data. The user may update the flight control system 200 (e.g., controllers/modules) based on analysis and processing of the collected data. The collected data may indicate how the engine operates under different conditions. For example, the collected data may indicate how engine torque relates to different operating conditions (e.g., altitude, temperature, and airspeed). Using this data, the user may update the flight control system (e.g., controller algorithms) over time to optimize performance of the engine. For example, a user may use a computing device (e.g., personal computer, specific programming device, etc.) to update the flight control system 200 according to the acquired data.

In some implementations, the flight control system 200 may include tunable control parameters (e.g., gain parameters) that are made accessible to the user. In these implementations, the user may modify the control parameters and monitor the outcome of the monitored control parameters.

In some implementations, the user may develop an engine model that may be a function of parameters included in the collected data. The user may then develop one or more controllers based on the engine model and collected data. For example, the user may refine the controller parameters based on the engine model and collected data. Although a user may refine the controller parameters over time, in some implementations, the flight control system 200 may be configured to automatically update controller parameters over time based on the collected data.

Using the flight control system 200 of the present disclosure may provide a straightforward path for improving the control and performance of a specific engine through data collection. For example, any algorithm that can be included in the engine torque control module components of FIGS. 3-4 may be designed using a mathematical model of how the engine operates. Generating a model that may be used to develop the engine torque control module 302 (e.g., engine torque controller 408) based on collected data is described hereinafter.

In some implementations, equations used to model the thrust produced by an aircraft's engine or the engine dynamics may include a "simplifying constant." A simplifying constant may refer to a parameter, approximated by a constant, that may vary with operating condition and that potentially varies from one particular engine to another (e.g., another engine of the same engine type). Two examples related to modeling turboprop engines are given below. Although the examples are related to modeling turboprop engines, a similar process may be employed on other engine types.

A first example of an engine model that may be iteratively improved upon through the use of the proposed control method is a model that takes advantage of the relationship between engine power and thrust using the equation $T=(P/v)\eta_{prop}$ where T is thrust, P is the engine power, v is the airspeed, and $\eta_{prop}$ is propeller efficiency. Propeller efficiency may be difficult to calculate and may play the role of a "simplifying constant." For example, the propeller efficiency may not truly be a constant, but may be treated as one. A model with increased complexity may express propeller efficiency as a function or airspeed, altitude, and power lever position according to the following equation: $\eta_{prop}=\eta_{prop}(v, h, \delta_P)$, where h is altitude and $\delta_P$ is power lever position. In this example, utilization of an engine-torque based inner control loop combined with a data collection may allow a user to construct a propeller efficiency function for a specific engine. Engine power may be calculated from the torque measurement feedback, thrust may be calculated through the use of accelerometer data and a reliable drag model, and assuming airspeed, altitude, and power lever position are logged, a propeller efficiency mapping can be established.

A second example approach for modeling turboprop engines that may be enhanced by the proposed technique is to express current thrust as a ratio to the thrust experienced at a reference altitude using the equations $T=T_{SL}(v, \delta_P)*(\rho/\rho_{SL})$ and $T_{SL}(v, \delta_P)=c_T(v, \delta_P)\rho_{SL}n^2 D^4$, where $T_{SL}$ is the thrust produced at sea level, $\rho$ and $\rho_{SL}$ are air density and air density at sea level respectively, n is the propeller rotational speed, D is the propeller diameter, and $c_T$ is the coefficient of thrust. In this schema, the coefficient of thrust is the function for which a mapping may be constructed through data collection. All other variables may be measured or known.

The technique of using data that shows the relationship between power lever position and engine torque as a function of operating condition to iteratively improve an engine model may be extended to more complex models. For example, more advanced turboprop engine models may include dependencies on temperature, blade pitch, variable propeller speed, and more in addition to the variables described in the simpler models above. Similar model complexity decisions may be made regarding other engine types as well. Improved model accuracy using additional model complexity may provide the potential for improved controller performance. The level of model complexity/accuracy may be application specific. Additional sensors may be implemented for collecting model-specific data. The specific additional sensors may depend on the complexity of the desired model.

FIG. 8 illustrates an example longitudinal control module 800. The example longitudinal control module 800 of FIG. 8 may provide for total power control with Z acceleration control. The longitudinal control module 800 generates a torque setpoint value $Torque_{SP}$ and an elevator setpoint value $Elev_{SP}$. The longitudinal control module 800 may generate the $Torque_{SP}$ and the $Elev_{SP}$ based on a received true airspeed setpoint ($TAS_{SP}$) and a vertical speed setpoint ($Vh_{SP}$). The longitudinal control module 800 may also use the following determined values: 1) a determined TAS value, 2) an x acceleration value (Xacc) (e.g., acceleration along the velocity vector), 3) a Z acceleration value (Zacc) (e.g., a vertical acceleration value), and 4) a determined pitch rate value. The longitudinal control module 800 may determine a plurality of values, some of which are illustrated in FIG. 8. Example illustrated values include: 1) a derivative of $TAS_{SP}$ (i.e., a TAS rate setpoint), 2) a derivative of $TAS_{ERR}$, 3) total power error, 4) a Zacc setpoint, and 5) a pitch rate setpoint (Pitch $Rate_{SP}$).

The longitudinal control module 800 may include a plurality of blocks that perform calculations associated with the longitudinal control module 800. For example, the longitudinal control module 800 may include a plurality of summing blocks (i.e., junctions) 802-1, 802-2, ..., 802-6 and a multiplication block 804. The longitudinal control module 800 may also include a gravitational constant multiplier block 806 (e.g., 9.81 m/s$^2$) and an aircraft estimated mass multiplier block 808. In some implementations, the longitudinal control module 800 may include a mass estimation module that estimates the mass of the aircraft 100 (e.g., as a function of fuel usage).

The longitudinal control module 800 includes a true airspeed controller time constant block 810 (e.g., "$1/T_V$" block). $T_V$ may be a time constant value. The longitudinal control module 800 may also include proportional-integral controller (PI) blocks, such as a PI controller for Vh ($PI_{Vh}$) 812 and a PI controller for Zacc ($PI_{Zacc}$) 814. The longitudinal control module 800 may also include a proportional integral feed forward (PIFF) controller, such as a PIFF controller for pitch rate ($PIFF_{PitchRate}$) 816. The total power error may be input into a block 818 including an integrator and a gain value. For example, the block 818 includes a power controller time constant $T_P$ and an integrator 1/s.

FIG. 9 illustrates another example longitudinal control module 900. The example longitudinal control module 900 of FIG. 9 may be referred to as a multi-input multi-output (MIMO) controller. The longitudinal control module 900 may receive $TAS_{SP}$, $Vh_{SP}$, TAS, Vh, and pitch rate. The longitudinal control module 900 may output $Torque_{SP}$ and $Elev_{SP}$. The longitudinal control module 900 includes a PID controller for TAS error ($PID_{TAS\ Error}$) 902 and a PD controller for TAS error ($PD_{TAS\ Error}$) 904. The longitudinal control module 900 also includes a PID controller for Vh error ($PID_{Vh\ Error}$) 906 and a PD controller for Vh error ($PD_{Vh\ Error}$) 908. The longitudinal control module 900 also includes a plurality of summing blocks 910-1, 910-2, ..., 910-5.

FIG. 10 illustrates another example longitudinal control module 1000. The example longitudinal control module 1000 of FIG. 10 may be referred to as a total energy control system (TECS). The longitudinal control module 1000 receives $TAS_{SP}$ and TAS. The squaring blocks 1002-1, 1002-2, summing block 1004, and ½ mass block 1006 generate a kinetic energy error value $KE_{ERR}$. The longitudinal control module 1000 also receives an altitude setpoint value $Alt_{SP}$ and a determined altitude (Alt). The longitudinal control module 1000 includes a summing block 1008 and mass·g block 1010 that generate a potential energy error value $PE_{ERR}$.

The longitudinal control module 1000 includes summing blocks that determine an energy balance error value and a total energy error. An energy balance PID controller ($PID_{BALANCE}$) 1012 determines a pitch rate$_{SP}$. A PIFF controller determines the $Elev_{SP}$. A total energy error PID controller ($PID_{TOTAL}$) 1014 determines a Torque$_{SP}$.

FIG. 11 illustrates an example engine torque control module 1100 and additional aircraft components. The engine torque control module 1100 includes a pseudo derivative controller 1102 that receives a torque setpoint. The power lever actuator 214-1 outputs a power lever angle in response to a power lever setpoint ($PwrLvr_{SP}$). The turboprop engine dynamics block 1104 may model the shaft output torque (e.g., measured by the torque sensor 204) generated by the aircraft in response to the power lever angle. In some cases, the turboprop engine dynamics 1104 may be properties of the aircraft 100 as received from the manufacturer. In these cases, the engine torque control system of the present disclosure may be retrofitted onto the aircraft 100 with set turboprop engine dynamics. In other implementations, the turboprop engine dynamics 1104 may be configured/tuned by the engine torque control system developer.

FIG. 12 illustrates example data acquired during a test of an engine torque control system implemented in a Cessna Caravan 208B. For example, the test data was acquired during a ground test in which the aircraft had the engine running and the parking brake on. Various torque setpoints were commanded to demonstrate torque setpoint tracking. The top graph in FIG. 12 illustrates engine torque versus time. The broken line illustrates example torque setpoint values. The solid line indicates measured torque. The bottom graph in FIG. 12 illustrates throttle vs time. The throttle measurement (i.e., power lever position) in the bottom portion is the measured power lever position in normalized units, where 1.0 is full throttle. The bottom portion illustrates power lever setpoint and power lever measurement, both of which are on top of one another in the graph, which may appear as a single solid line.

Components of the UA 100 and the GCS 108 illustrated herein, such as the systems, modules, and data, may represent features included in the UA 100 and the GCS 108. The systems, modules, and data described herein may be embodied by electronic hardware, software, firmware, other aircraft avionics, or any combination thereof. Depiction of different components as separate does not necessarily imply whether the components are embodied by common or separate electronic hardware or software components. In some implementations, the components depicted herein may be realized by common electronic hardware and software components. In some implementations, the components depicted herein may be realized by separate electronic hardware and software components.

The electronic hardware and software components may include, but are not limited to, one or more processing units, one or more memory components, one or more input/output (I/O) components, and interconnect components. Interconnect components may be configured to provide communication between the one or more processing units, one or more memory components, and the one or more I/O components. For example, the interconnect components may include one or more buses that are configured to transfer data between electronic components. The interconnect components may also include control circuits that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology, or any other memory components.

Memory components may include (e.g., store) data described herein. Memory components may also include instructions that may be executed by one or more processing units. For example, memory may include computer-readable instructions that, when executed by one or more processing units, cause the one or more processing units to perform the various functions attributed to the systems/modules described herein. The I/O components may refer to electronic hardware and software that provides communication with a variety of different devices. For example, the I/O components may provide communication between other devices and the one or more processing units and memory components.

What is claimed is:

1. An aircraft control system comprising:
a longitudinal control module configured to generate a desired torque value and a desired elevator position value for an aircraft based on a desired airspeed value, a desired altitude value, an actual airspeed value, and an actual altitude value;
an engine torque control module configured to generate a desired power lever position value based on the desired torque value and a measured engine torque value that indicates a measured engine torque in the aircraft and configured to limit the desired torque value to a maximum torque value;
a torque limit determination module configured to:
receive an operator override torque limit from a ground control station; and
set the maximum torque value to the operator override torque limit; and
an actuator control system configured to generate a power lever position command and an elevator position command for the aircraft based on the desired power lever position value and the desired elevator position value, the power lever position command configured to move a power lever in the aircraft into a desired power lever position corresponding to the desired power lever position value.

2. The aircraft control system of claim 1, further comprising a guidance module configured to generate the desired airspeed value and the desired altitude value for the aircraft based on flight pattern data, wherein the flight pattern data includes a sequence of waypoints that each indicate a target location for the aircraft over time.

3. The aircraft control system of claim 1, wherein the power lever position command is configured to control an aircraft engine included on the aircraft.

4. The aircraft control system of claim 1, wherein the power lever position command is configured to control a power lever actuator that actuates the power lever in the aircraft.

5. The aircraft control system of claim 1, wherein the elevator position command is configured to control an elevator actuator that actuates an elevator on the aircraft.

6. The aircraft control system of claim 1, further comprising an engine torque sensor configured to generate the measured engine torque value.

7. The aircraft control system of claim 1, wherein the engine torque control module is configured to store aircraft conditions when the measured engine torque value reaches the maximum torque value, and wherein the aircraft conditions include at least one of the power lever position, air temperature, airspeed, and altitude.

8. The aircraft control system of claim 7, wherein the engine torque control module is configured to generate the desired power lever position based on the stored aircraft conditions in the event the engine torque value is unavailable.

9. The aircraft control system of claim 1, further comprising a torque limit determination module configured to:
determine a current phase of flight for the aircraft; and
determine the maximum torque value based on the current phase of flight.

10. The aircraft control system of claim 1, further comprising a torque limit determination module configured to determine the maximum torque value based on a change in aircraft flap position.

11. A non-transitory computer-readable medium comprising computer-executable instructions configured to cause one or more processing units of an aircraft to:
generate a desired torque value and a desired elevator position value for an aircraft based on a desired airspeed value, a desired altitude value, an actual airspeed value, and an actual altitude value;
generate a desired power lever position value based on the desired torque value and a measured engine torque value that indicates a measured engine torque in the aircraft;
limit the desired torque value to a maximum torque value;
receive an operator override torque limit from a ground control station;
set the maximum torque value to the operator override torque limit; and
generate a power lever position command and an elevator position command for the aircraft based on the desired power lever position value and the desired elevator position value, the power lever position command configured to move a power lever in the aircraft into a desired power lever position corresponding to the desired power lever position value.

12. The computer-readable medium of claim 11, further comprising instructions that cause the one or more processing units to generate the desired airspeed value and the desired altitude value for the aircraft based on flight pattern data, wherein the flight pattern data includes a sequence of waypoints that each indicate a target location for the aircraft over time.

13. The computer-readable medium of claim 11, wherein the power lever position command is configured to control an aircraft engine included on the aircraft.

14. The computer-readable medium of claim 11, wherein the power lever position command is configured to control a power lever actuator that actuates the power lever in the aircraft.

15. The computer-readable medium of claim 11, wherein the elevator position command is configured to control an elevator actuator that actuates an elevator on the aircraft.

16. The computer-readable medium of claim 11, further comprising instructions that cause the one or more processing units to receive the measured engine torque value from an engine torque sensor.

17. The computer-readable medium of claim 11, further comprising instructions that cause the one or more processing units to store aircraft conditions when the measured engine torque value reaches the maximum torque value, and wherein the aircraft conditions include at least one of the power lever position, air temperature, airspeed, and altitude.

18. The computer-readable medium of claim 17, further comprising instructions that cause the one or more processing units to generate the desired power lever position based on the stored aircraft conditions in the event the engine torque value is unavailable.

19. The computer-readable medium of claim 11, further comprising instructions that cause the one or more processing units to:
determine a current phase of flight for the aircraft; and
determine the maximum torque value based on the current phase of flight.

20. The computer-readable medium of claim 11, further comprising instructions that cause the one or more processing units to determine the maximum torque value based on a change in aircraft flap position.

* * * * *